US012522150B2

(12) United States Patent
Elder et al.

(10) Patent No.: US 12,522,150 B2
(45) Date of Patent: Jan. 13, 2026

(54) FOLDING VEHICLE RACK SYSTEM

(71) Applicant: Rivian IP Holdings, LLC, Plymouth, MI (US)

(72) Inventors: Christian V. Elder, Irvine, CA (US); Cameron James Robert Mcroberts, Surrey (GB)

(73) Assignee: Rivian IP Holdings, LLC, Plymouth, MI (US)

( * ) Notice: Subject to any disclaimer, the term of this patent is extended or adjusted under 35 U.S.C. 154(b) by 178 days.

(21) Appl. No.: 18/089,430

(22) Filed: Dec. 27, 2022

(65) Prior Publication Data

US 2024/0010135 A1 Jan. 11, 2024

Related U.S. Application Data

(60) Provisional application No. 63/359,757, filed on Jul. 8, 2022.

(51) Int. Cl.
*B60R 9/06* (2006.01)

(52) U.S. Cl.
CPC ........................ *B60R 9/06* (2013.01)

(58) Field of Classification Search
CPC ... B60R 2011/0082; B60R 9/045; B60R 9/06; B60P 3/40; B62D 33/0207

USPC ........................................................ 224/579
See application file for complete search history.

(56) References Cited

U.S. PATENT DOCUMENTS

| | | | | |
|---|---|---|---|---|
| 1,036,222 A * | 8/1912 | Griffenberg | ........... | B63H 16/04 416/142 |
| 2,021,702 A * | 11/1935 | Soss | .......... | E05D 3/16 16/369 |
| 4,131,378 A * | 12/1978 | Daws | ......... | E05D 3/12 16/388 |
| 4,532,674 A * | 8/1985 | Tobey | .................... | B64G 99/00 16/295 |
| 5,431,472 A * | 7/1995 | Coffland | ................... | B60R 9/00 296/10 |
| 7,464,977 B1 * | 12/2008 | Price | ......... | B60P 3/40 296/26.05 |
| 10,036,418 B2 * | 7/2018 | Lowrey | ................... | F16C 11/10 |
| 10,247,230 B2 * | 4/2019 | McCullough | ........... | F16C 11/10 |
| 11,987,295 B2 * | 5/2024 | Reyes | ............... | B62D 33/0207 |
| 2014/0090256 A1 * | 4/2014 | Pringnitz | ............... | A01G 3/083 30/151 |
| 2015/0258940 A1 * | 9/2015 | Breeden, III | ........... | B60R 9/045 224/405 |

* cited by examiner

*Primary Examiner* — Adam J Waggenspack
(74) *Attorney, Agent, or Firm* — Haley Guiliano LLP

(57) ABSTRACT

Particular embodiments may provide an apparatus that includes a bar and a hinge connected to the bar, wherein the hinge is configured to rotate the bar and reconfigure the apparatus between an extended configuration and a folded configuration.

17 Claims, 16 Drawing Sheets

FOLDING VEHICLE RACK SYSTEM

CROSS-REFERENCE TO RELATED APPLICATIONS

This application is a non-provisional application under 35 U.S.C. § 119(e) of U.S. Patent Application No. 63/359,757, filed Jul. 8, 2022, the entire contents of which are hereby expressly incorporated by reference in their entirety.

INTRODUCTION

The exterior of vehicles, such as the vehicles' roof or truck beds, may be used to transport various loads that may not otherwise fit inside the vehicle. Vehicle rack systems allow such loads to be transported, loads that may otherwise be difficult or dangerous to transport without a rack system. The rack systems are often structures that mount or attach to the vehicle, such as on the roof or on truck beds, to provide a stable platform for attaching additional loads.

BRIEF SUMMARY

In some cases, a vehicle rack system that is useful in many different situations when deployed may be difficult to stow when not in use. Specifically, the size of the rack system may pose challenges in efficiently storing the rack. The present disclosure introduces a foldable vehicle rack system that can be efficiently stored when not in use. The vehicle rack system may be described particularly from the perspective of a rack system for a truck bed, but the rack system as described herein may also be applied to other parts of a vehicle, such as the roof of the vehicle. In various embodiments, a hinge may be included in the truck bed rack system to facilitate the folding process. However, hinges clogged with dust and debris may reduce the ability of the objects connected to the hinge to rotate. Thus, reducing the dust and debris in hinges may reduce the interference to the connected objects' movement while also potentially extending the hinges' and rack system's operational lifetime. Reducing the hinges' exposure to external environments may reduce the amount of debris that is built up or decrease the speed at which the debris builds up, among various other potential advantages. The present disclosure also introduces a folding mechanism that may reduce a hinge's exposure to external environments, and may be incorporated into various vehicle accessories, such as a truck bed rack system. In various embodiments, the folding mechanism may include a hinge that is enclosed by the objects it connects when the system comprising the hinge and objects are in a particular configuration. The hinge may allow the objects it connects to rotate between various configurations, while components of the hinge remain enclosed by the objects as they are rotating about the hinge. As a result, the hinge's exposure to an external environment may be reduced, thus reducing the dust and debris that may accumulate in the hinge.

In some embodiments, an apparatus includes a bar and a hinge connected to the bar, wherein the hinge is configured to rotate the bar and reconfigure the apparatus between an extended configuration and a folded configuration.

In some embodiments, the bar is a first bar, and the apparatus further includes a second bar connected to the hinge, wherein the hinge is further configured to rotate the second bar relative to the first bar when reconfiguring the apparatus between the extended configuration and the folded configuration.

In some embodiments, the first bar includes a top bar and the second bar includes a side bar.

In some embodiments, the bar is a first bar, and the apparatus further includes a second bar connected to the hinge, wherein the hinge includes a first plurality of members coupled to the first bar and a second plurality of members coupled to the second bar, wherein the first plurality of members and the second plurality of members are connected by a pin.

In some embodiments, the bar is a first bar, and the apparatus further includes a second bar connected to the hinge, wherein the first bar moves along a first plurality of members of the hinge and the second bar moves along a second plurality of members of the hinge when the hinge reconfigures the apparatus between the extended configuration and the folded configuration.

In some embodiments, the bar is a first bar, and the apparatus further includes a second bar connected to the hinge, wherein an angle between the first bar and the second bar when the apparatus is in the folded configuration is less than 90 degrees, and wherein the angle between the first bar and the second bar when the apparatus is in the extended configuration is at least 90 degrees.

In some embodiments, the bar is a first bar, and the apparatus further includes a second bar connected to the hinge, wherein the second bar includes a protrusion that slides into a recessed section of the first bar when the apparatus is in the extended configuration.

In some embodiments, the bar is a first bar, and the apparatus further includes a second bar connected to the hinge, wherein the first bar includes a pad that is compressed when the apparatus is in the extended configuration, wherein the pad decompresses to provide a force to the second bar when the apparatus is reconfigured from the extended configuration to the folded configuration.

In some embodiments, the hinge is exposed when the apparatus is in the folded configuration.

In some embodiments, the hinge is enclosed by the bar when the apparatus is in the extended configuration.

In some embodiments, the bar includes a recessed section, wherein the hinge is positioned in the recessed section when the apparatus is in the extended configuration.

In some embodiments, the hinge pivots about a pivot point in the recessed section when the apparatus is reconfigured between the extended configuration and the folded configuration.

In some embodiments, the apparatus further includes a latch connected to the bar, wherein the latch locks the bar in place when the apparatus is reconfigured in the extended configuration.

In some embodiments, the bar comprises an attachment point for attaching a second bar.

In some embodiments, the apparatus further includes a lock to secure the bar in place when the apparatus is in the extended configuration and when the apparatus is in the folded configuration.

In some embodiments, the apparatus further includes a feedback mechanism to provide an indication when the apparatus has been reconfigured to the extended configuration and when the apparatus has been reconfigured to the folded configuration.

In some embodiments, an apparatus includes a first rack, a second rack, and a cross brace. The first rack includes a first top bar and a first side bar connected to the first top bar, and wherein the second rack includes a second top bar and a second side bar connected to the second top bar. The cross brace is connected to the first side bar of the first rack and the second side bar of the second rack.

In some embodiments, the cross brace is configured to connect to and disconnect from the first side bar of the first rack via an attachment point on the first side bar of the first rack.

In some embodiments, the first rack includes a hinge connected to the first top bar and the first side bar, and wherein the hinge is configured to reconfigure the first rack between an extended configuration and a folded configuration.

In some embodiments, a method of assembling an apparatus includes positioning a first part of a hinge in a first recessed section of a first bar. The method further includes positioning a second part of the hinge in a second recessed section of a second bar. The method further includes attaching the first part of the hinge to a first pivot point in the first recessed section. The method further includes attaching the second part of the hinge to a second pivot point in the second recessed section.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

The present disclosure introduces a foldable vehicle rack system as well as a folding mechanism that may reduce the exposure of a hinge to external environments. The vehicle rack system may be described particularly from the perspective of a rack system for a truck bed, but the rack system as described herein may also be applied to other parts of a vehicle, such as the roof of the vehicle. The hinge may connect a first bar and a second bar of the rack system while also allowing the bars to be rotated, thereby reconfiguring the rack system between an extended configuration and a folded configuration. The extended configuration may be an operational state for the rack system where the rack system is able to perform its intended tasks, while the folded configuration may be a storage state for the rack system. While the rack system is in the extended configuration, the bars may enclose the hinge, thereby protecting the hinge from an external environment. The first bar of the rack system may be a top bar that extends transversely across a truck bed and supports other objects that are attached to the rack system, such as baggage, exercise equipment, camping equipment, snowboarding or skiing equipment, etc. The second bar of the rack system may be a side bar that is attached to the truck bed and provides supports to the top bar. The bars may, in some embodiments, subtend a larger angle in the extended configuration than an angle in the folded configuration. For example, in the extended configuration, the first and second bars of the rack system may be arranged such that the angle between the first and second bars is greater than 90 degrees. In the folded configuration, the first and second bars of the rack system may be arranged such that the angle between the bars is less than 90 degrees.

Figure 1A:
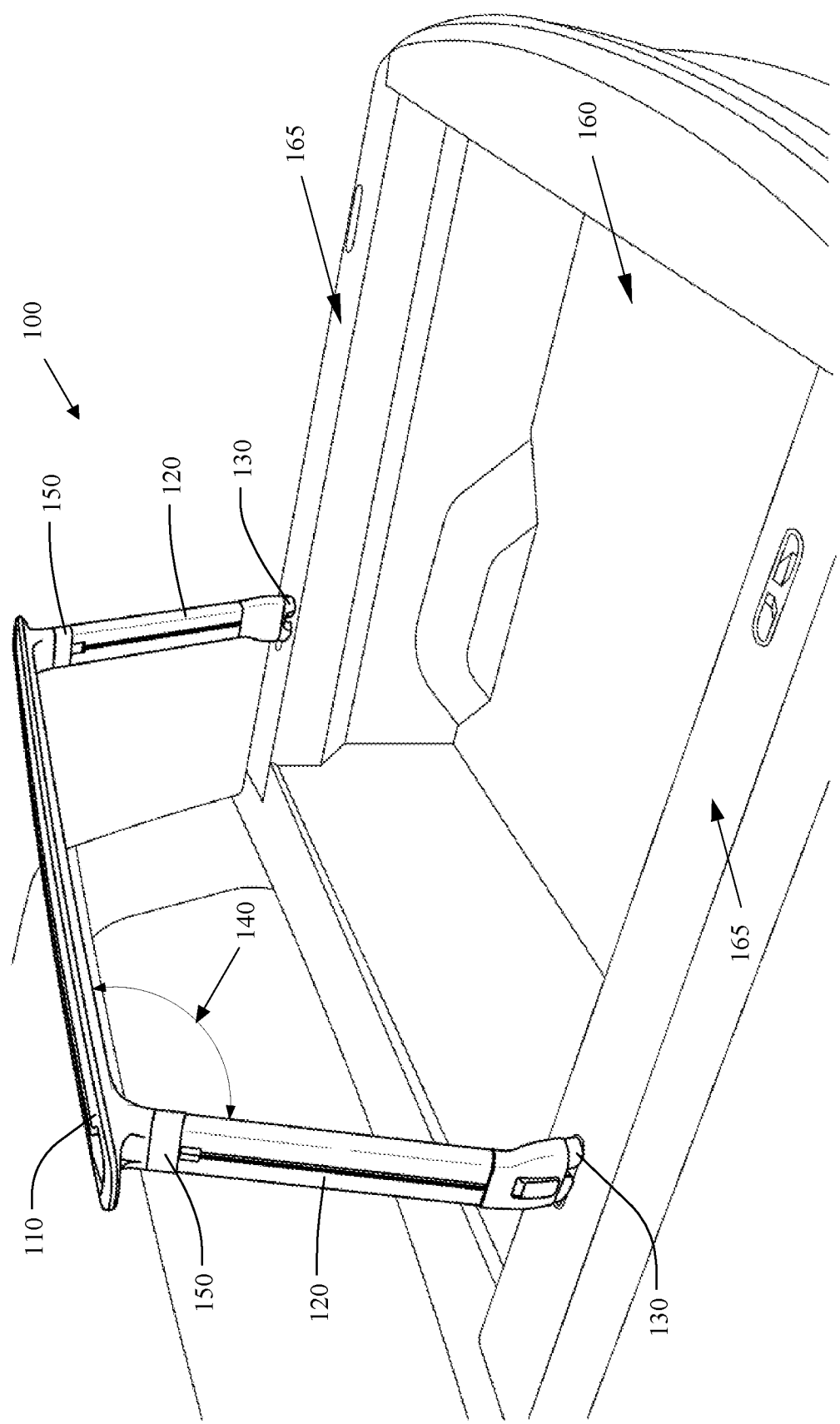
FIG. 1A illustrates an example truck bed rack system in an extended configuration and installed on truck bed.

FIG. 1A illustrates an example truck bed rack system 100 in an extended configuration and installed on truck bed 160. In the example, the rack system 100 may include a first bar 110 and second bar 120. In various embodiments, the rack system in the extended configuration may be deployed onto a truck bed 160 by securely attaching the second bar 120 to the truck bed side walls 165, such as through an attachment point 130 at the bottom of the second bar. The attachment point 130 may be any structure that securely connects the second bar 120 to the truck bed, such as screws or clamps. In various embodiments, the attachment point 130 may also include electrical contacts or various electrical components. The electrical components may enable the rack system to receive electrical power from the vehicle it is attached to as well as exchange information. The rack system 100 being able to receive electrical power may in turn enable additional load types to be supported, namely those that may require an electrical power supply, such as refrigerators, smaller electric vehicles, or various powered camping equipment, among many others. Additionally, electrical components in the attachment point 130 may enable the rack system 100 to communicate with the vehicle. With this functionality, the rack system may, for example, provide information to vehicle head units regarding the load currently attached to the rack system 100, or potentially even data on the condition of the rack system itself. While some applications for including electrical components in the attachment point 130 are described, many other applications may be appropriate in various embodiments.

As mentioned above, the first bar 110 may be the top bar that extends transversely across the truck bed and may be where additional objects are attached. The second bar 120 may be the side bar that provides support to the first bar 110. When the rack system 100 is deployed in the extended configuration, another object (such as a vehicle accessory) may be attached to the first bar 110. The force applied onto the first bar 110 by that additional object may then be transferred via the second bar 120 to the truck bed side walls 165. Additionally, in the extended configuration, the angle 140 between the first bar 110 and second bar 120 may be greater than 90 degrees, where the specific angle may differ in various embodiments. The rack system 100 may also include a hinge (not shown in FIG. 1A) positioned inside the bars at location 150 that allows the first bar 110 and the second bar 120 to rotate and thus reconfigures the rack system between the extended configuration as shown and a folded configuration that may reduce the storage space requirement when stowed, as described further herein. As shown in FIG. 1A, the hinge that may be positioned at location 150 may be hidden from an external environment when the rack system 100 is in the extended configuration. However, despite being hidden, the hinge positioned at location 150 may still support the rotational freedom of the first and second bars to rotate and reconfigure the rack system between the extended configuration and a folded configuration. The hinge being hidden when the rack system is in the extended configuration may also allow for a greater aesthetic than various alternative approaches where the hinge may remain exposed when the rack system is in the extended configuration.

Figure 1B:
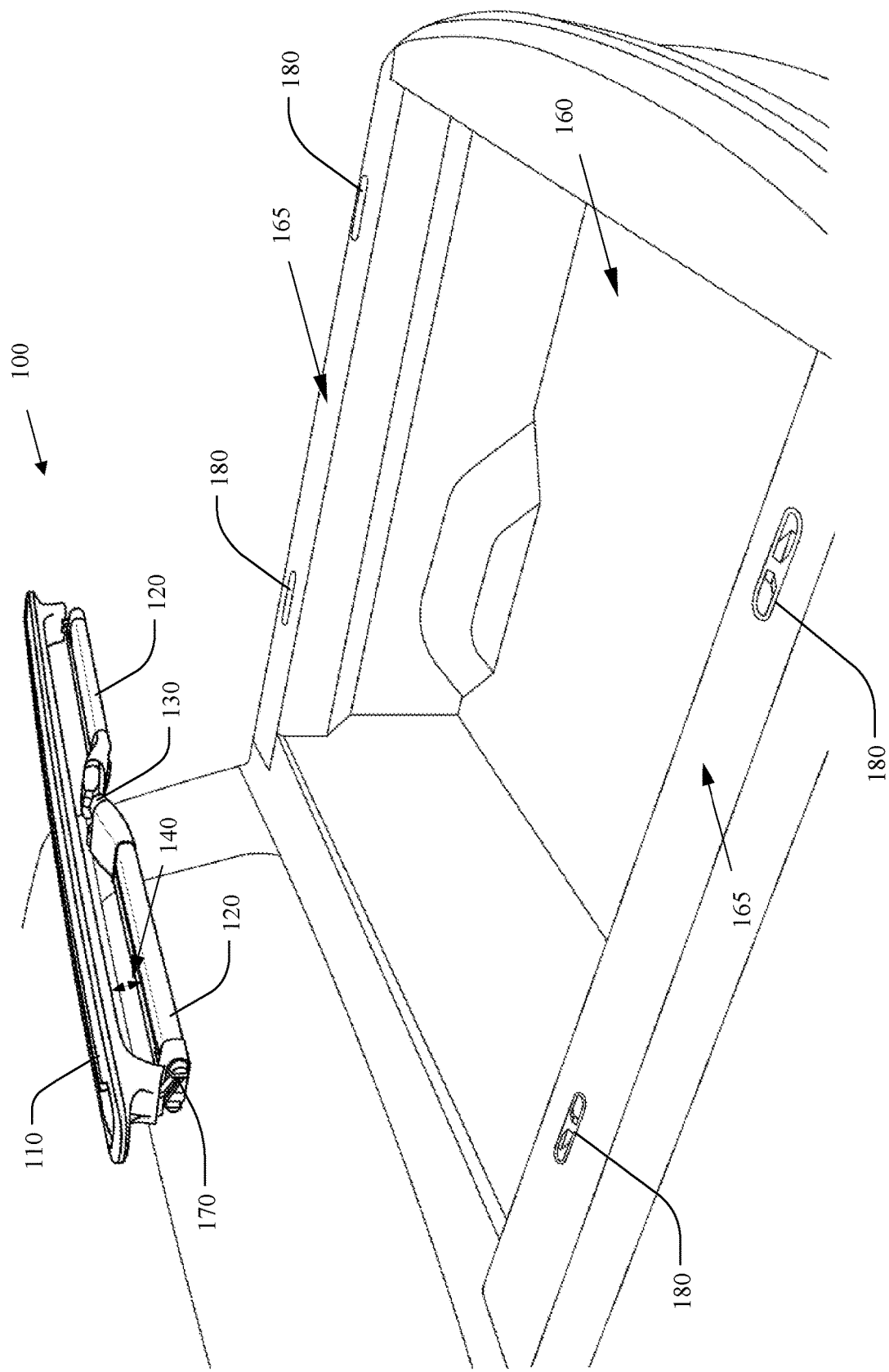
FIG. 1B illustrates the example truck bed rack system in a folded configuration.

FIG. 1B illustrates the example truck bed rack system 100 in a folded configuration. In the folded configuration, the second bar 120 of the rack system 100 may be rotated toward the first bar 110 such that the angle 140 between the first bar 110 and second bar 120 bar is less in the folded configuration than in the extended configuration. For example, the angle in the folded configuration may be less than 90 degrees and in the extended configuration greater than 90 degrees. The angle between the first and second bars in the example folded configuration may result in the first bar 110 and second bar 120 being roughly parallel to one another, but the specific angle between the first and second bars in the folded configuration may differ in various embodiments such that the first bar 110 and second bar 120 may not be parallel with one another. For example, the first bar 110 and the second bar 120 not being roughly parallel may allow additional components associated with the rack system 100 (such as the cross brace 450 of FIGS. 4A and 4B) to be positioned between the first bar 110 and second bar 120 to allow for more compact storage. Unlike when the rack system is in the extended configuration, the hinge 170 that may be positioned at location 150 of FIG. 1A may be exposed in the folded configuration. The hinge 170 may connect the first bar 110 and second bar 120 while also allowing the rack system 100 to rotate between the extended configuration of FIG. 1A and the folded configuration of FIG. 1B. That is, the hinge 170 may be connected to the first bar 110 and the second bar 120. The hinge 170 may be configured to rotate the first bar 110. Further, the hinge 170 may be configured to rotate the second bar 120. As such, the hinge 170 may be configured to rotate the first bar 110 and second bar 120 to reconfigure the rack system 100 between the extended configuration and the folded configuration. Various hinges may be appropriate for the hinge 170, such as spring hinges, continuous hinges, butt hinges, piano hinges, or concealed hinges. Another example hinge embodiment is also described further herein. The example hinge embodiment may include members that pivot about pins positioned in recessed sections of the bars of the rack system. The bars of the rack system may be coupled to the hinge members and thus the pivoting motion of the hinge members may extend to the bars, allowing the bars to rotate and thus the rack system to be reconfigured between an extended and folded configuration. The bars of the rack system may also slide along the hinge members as the hinge members are pivoting so the bars may be brought together when reconfigured into the extended configuration. Additionally, the rack system 100 in the folded configuration may reduce the size of the rack system along at least one dimension compared to the size of the rack system in the extended configuration. Specifically, the straight line distance from the first bar 110 to the attachment point 130 at the ends of the second bar 120 may be smaller in the folded configuration of FIG. 1B than in the extended configuration of FIG. 1A. In the extended configuration of FIG. 1A, the straight line distance may be at least the entire length of the second bars 120, whereas in the folded configuration of FIG. 1B, the straight line distance may be greatly reduced. That dimension of the rack system being reduced in the folded configuration may reduce the storage space required to stow the rack system.

The truck bed side walls 165 may also include attachment points 180 that couple with the attachment points 130 of the rack system 100 to secure the rack system to the truck bed side walls. Similar to how the attachment point 130 of the rack system 100 may be various different structures, the attachment points 180 on the truck bed side walls 165 may also be various different structures. In some embodiments, the attachment points 130 and 180 couple with one another so that the rack system 100 connects to the truck bed. For example, the attachment point 130 may be clamps for securing the second bar 120 of the rack system 100 to the truck bed, as described above, and the attachment points 180 on the truck bed side walls 165 may be striker bars that the clamps grasp in order to couple the rack system 100 with the truck bed side walls 165.

Figure 2A:
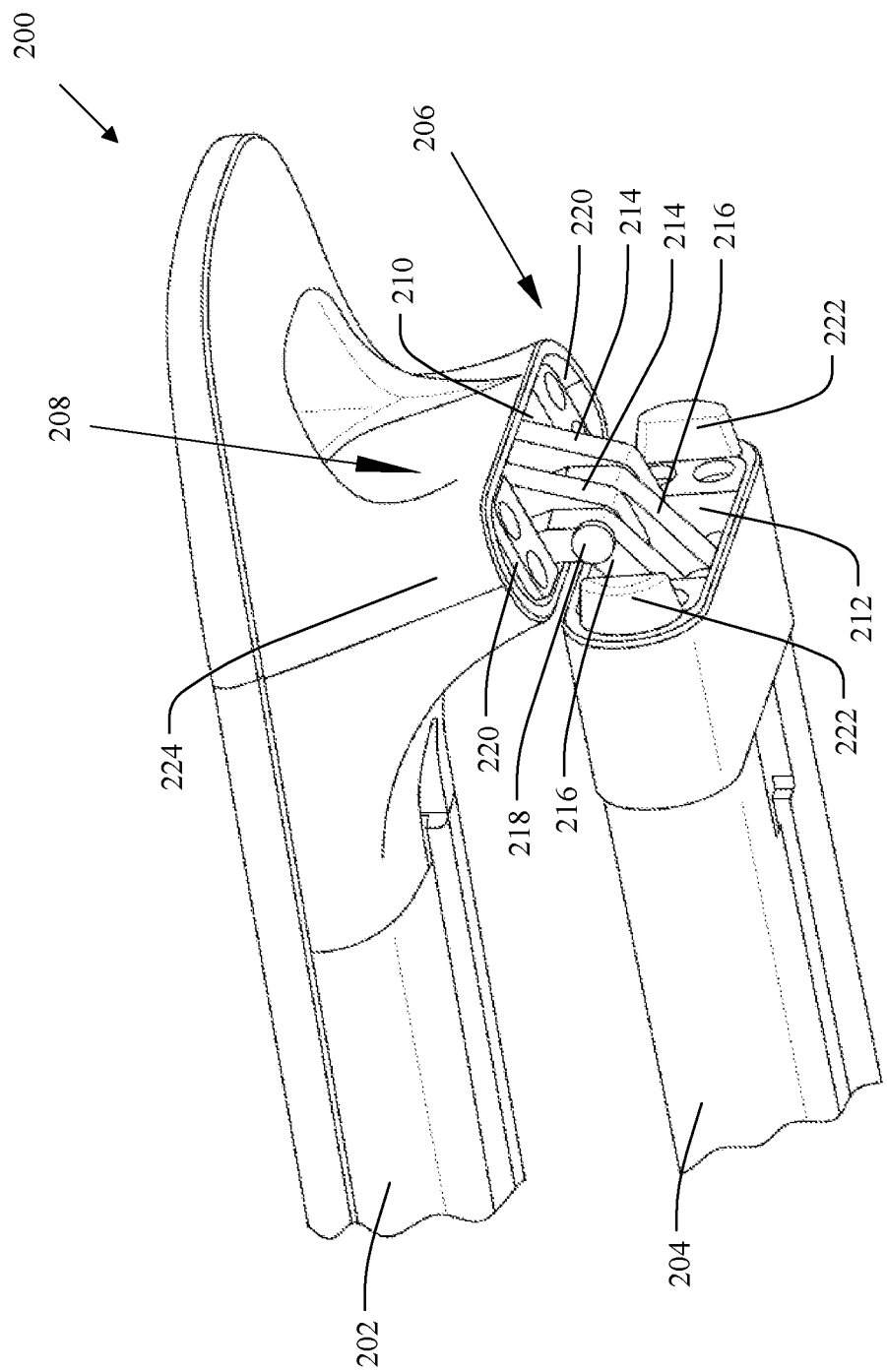
FIG. 2A illustrates a perspective view of another exemplary truck bed rack system in a folded configuration.

FIG. 2A illustrates a perspective view of another exemplary truck bed rack system 200 in a folded configuration. The rack system 200 may include a first bar 202 and a second bar 204 that is connected by a hinge 206 configured to rotate the second bar 204 relative to the first bar 202. The first bar 202 and the second bar 204 may also each be individually rotatable about the hinge 206. Further, the first bar 202 and the second bar 204 may each be individually rotatable based at least on the hinge 206. The hinge 206 may be configured to rotate the first bar 202 and the second bar 204 to reconfigure the rack system 200 between an extended configuration and a folded configuration, as described above and further herein, but the hinge 206 may also be configured to rotate the first bar 202 and the second bar 204 to reconfigure the rack system 200 between a plurality of discrete configurations including a fully extended configuration, a fully folded configuration, and one or more configurations between the fully extended and fully folded configurations. The hinge 206 may also be configured to rotate the first bar 202 and the second bar 204 to reconfigure the rack system 200 between an extended configuration, a folded configuration, and a plurality of continuous configurations, where each continuous configuration may be a unique configuration somewhere between the extended and folded configurations.

The first bar 202 may include a section 208 that extends away from a generally elongate section of the first bar. In the example rack system 200, the first bar 202 may generally extend in a first (e.g., horizontal) direction, but may include a section 208 that instead extends in a direction at an angle from the first direction (e.g., as shown, the extending section 208 extends downward and an angle from the horizontal). In various embodiments, the section 208 may extend from an end of the first bar, but section 208 may also extend from somewhere along the body of the first bar. The section 208 may be included in various embodiments in order for the first bar 202 to make contact with the second bar 204 and thus enclose the hinge 206 when the rack system 200 is rotated from the folded configuration to the extended configuration. In various embodiments, the first bar 202 may be the first bar 110 of FIG. 1A, the second bar 204 may be the second bar 120 of FIG. 1A, and the hinge 206 may be the hinge positioned at location 150 of FIG. 1A or the hinge 170 of FIG. 1B.

In various embodiments, the first bar 202 may include a recessed section 210 in which hinge 206 may be positioned. In various embodiments, the recessed section 210 may be positioned in section 208 of the first bar. Similarly, the second bar 204 may also include a recessed section 212 in which hinge 206 may also be positioned. The hinge 206 may be connected to the first bar 202 via the recessed section 210 and may be connected to the second bar 204 via the recessed section 212. Specifically, various components of the hinge 206 may be attached to the surfaces of the recessed sections 210 and 212. As the hinge 206 may be positioned inside of the recessed sections 210 and 212 when the rack system 200 is rotated into the extended configuration, as described further herein, the recessed section 210 may include a space large enough to fit at least part of the hinge 206 inside of it, and the recessed section 212 may include a space large enough to fit the remainder of the hinge 206 not positioned in the recessed section 210. That is, a first part of the hinge may be positioned in a first recessed section 210 of the first bar 202, while a second part of the hinge may be positioned in a second recessed section 212 of the second bar 204. Although the example embodiment of FIG. 2A illustrates two recessed sections 210 and 212, various embodiments may include only one recessed section. This may mean that only the first bar 202 includes a recessed section in which the entirety of the hinge 206 may be positioned in when the hinge rotates the first and second bars to reconfigure the rack system 200 into the extended configuration. Similarly, various other embodiments may only include a recessed section in the second bar 204 in which the entirety of the hinge 206 may be positioned in when the first and second bars are rotated to reconfigure the rack system into the extended configuration. It may also be noted that while the hinge 206 may be enclosed by the first bar 202 and second bar 204 when the rack system is in the extended configuration, as mentioned above and described further herein, the hinge may not be enclosed by the first and second bars when the rack system is in the folded configuration. Consequently, the hinge 206 may be exposed to an external environment when the rack system is in the folded configuration.

In various embodiments, the hinge 206 may include a first plurality of members 214 that are coupled to the first bar 202. Specifically, the first plurality of members 214 may be coupled to the first bar 202 via the surfaces of the recessed section 210. In various embodiments, the first plurality of members 214 may be coupled directly to the surfaces of the recessed section 210, such as through welding, but in various other embodiments, the first plurality of members may also be coupled to a pin that is positioned inside the recessed section 210 of the first bar 202, which is described further herein with respect to FIG. 2D. Additionally, while one end of the first plurality of members 214 may be coupled to the first bar 202, the other end of the first plurality of members 214 may be coupled to the second bar 204, such as via a separate pin positioned in the recessed section 212 of the second bar 204, which is also described further herein with respect to FIG. 2D. The present disclosure may describe the hinge 206 as including pins, but similar components may be used in place of the pins in other embodiments, such as rods or shafts, among many others.

The hinge 206 may also include a second plurality of members 216 that are coupled to the second bar 204 via the surfaces of the recessed section 212. Similar to the first plurality of members, the second plurality of members 216 may be coupled directly to the surfaces of the recessed section 212, such as through welding, but in various other embodiments, the second plurality of members may also be coupled to a pin that is positioned inside the recessed section 212 of the second bar 204, which is described further herein with respect to FIG. 2D. While one end of the second plurality of members 216 may be coupled to the second bar 204, the other end of the second plurality of members 216 may be coupled to a separate pin positioned in the recessed section 210 of the first bar 202, as described further herein with respect to FIG. 2D. In various embodiments, the first plurality of members 214 and second plurality of members 216 may be plates made of metal or a similar material.

In various embodiments, the hinge 206 may also include another pin 218 positioned through the first plurality of members 214 and the second plurality of members 216 in order for the first and second plurality of members to be connected together. Specifically, each of the members in the first and second plurality of members may include an opening, where the openings of all the constituent members in the first and second plurality of members may be aligned to form a tube structure. The pin 218 may then be positioned into the tube structure and thus positioned through all of the members of the first and second plurality of members in order to connect them together. In various embodiments, the pin 218 may also lock the hinge 206 in a specific position and prevent the hinge 206 from continuing to rotate the first bar 202 and the second bar 204. The pin 218 may then be secured in place after being positioned to prevent the pin from sliding out of position. Various methods may be appropriate to secure the pin, where different methods may be used for different purposes. For example, in various embodiments where the pin 218 may be able to rotate relative to the first plurality of members 214 and second plurality of members 216, the pin 218 may be secured in place by including lock nuts onto the end of the pin. On the other hand, in various embodiments where the pin 218 may be kept static relative to the first and second plurality of members, the pin 218 may be secured in place by being welded to each of the members in the first and second plurality of members.

In various embodiments, the first bar 202 may also include recessed sections 220. In various embodiments, the recessed sections 220 may also be positioned in section 208 of the first bar. The recessed sections 220 may be configured to receive protrusions 222 on the second bar 204 when the first bar 202 and second bar 204 are rotated to reconfigure the rack system 200 from the folded configuration to the extended configuration. Specifically, when the hinge 206 rotates the second bar 204 and thereby reconfigures the rack system into an extended configuration, the protrusions 222 on the second bar may slide into and become positioned inside of the recessed sections 220 of the first bar 202. The combination of the recessed sections 220 and the protrusions 222 may help to address the misalignment that may be present in the hinge 206. In other words, the recessed sections 220 and protrusions 222 of the first bar 202 and second bar 204, respectively, may help guide the first and second bars into the correct position when they are rotated in the process of reconfiguring the rack system from the folded configuration to an extended configuration. Although the example embodiment of FIG. 2A is illustrated with a pair of recessed sections 220 in the first bar as well as a pair of protrusions 222 on the second bar, various embodiments may have fewer or more recessed sections and protrusions. However, various embodiments may consider that the number of recessed sections in the first bar 202 may match with the number of protrusions on the second bar 204 for the rack system to rotate into the extended configuration. Additionally, when the protrusions 222 slide into the recessed sections 220, the protrusions 222 may make contact with a pad (not shown in FIG. 2A, but exemplary pads 238 are illustrated in FIG. 2E) positioned at location 224 inside of the recessed sections 220. When sliding into the recessed sections 220, the protrusions 222 may compress the pad positioned at location 224, as described further herein.

In various embodiments, the rack system 200 may include fastener holes that may be used to fasten the hinge 206 to other components of the rack system 200, such as the first bar 202 and the second bar 204. The hinge 206 may further include various locking features to prevent the rack system from unintentionally swinging open from the folded configuration due to the weight of the first bar 202 and second bar 204. The locking features may engage automatically when the rack system is rotated into the folded configuration, or the locking features may be engaged manually by a user. Automatically engaging locking features may trigger when the angle between the first bar 202 and second bar 204 reaches a certain angle, but various other triggers may also be appropriate. By preventing the rack system from unintentionally swinging open, the locking features may help ensure that the rack system in the folded configuration retains its advantages of requiring less storage space to stow away as well as allowing a greater aesthetic.

The hinge 206 may also include various damping features to enable a smoother transition to the folded configuration. To help ease the rotation of the first bar 202 and second bar 204 into the folded configuration, the damping features may slow the rotation as the first and second bars approach the folded configuration. The damping features may also allow for more control when rotating the first bar 202 and second bar 204 into the folded configuration. In various embodiments, the damping features may also work with the locking features to prevent the rack system from unintentionally swinging open from the folded configuration.

In various embodiments, the hinge 206 may also include various tactile feedback mechanisms to inform users that a closing motion to rotate the rack system 200 into the folded configuration is complete. The tactile feedback mechanisms may also inform users when an opening motion to rotate the rack system 200 into the extended configuration is complete. This may prevent users from overstressing themselves or the rack system 200 when reconfiguring the rack system 200 into the folded configuration or the extended configuration. The tactile feedback mechanisms may include those that automatically activate when the rack system finishes rotating into the folded configuration, as well as those that a user may activate to provide themselves an indication that the rack system has been completely rotated into the folded configuration.

In various embodiments of the rack system, the first bar 202 and second bar 204 may be constructed of materials such as steel or aluminum, but many other materials may also be appropriate depending on the contexts that different embodiments may operate in. The hinge 206 may also be constructed of a variety of materials, such as steel, brass, bronze, or copper. In various embodiments, at least one of the first bar 202, the second bar 204, and the hinge 206 may be constructed with a plurality of different materials. For example, the first bar 202 may be partially constructed of steel and also partially constructed of aluminum, or any other combination of materials as appropriate. The second bar 204 and hinge 206 may also similarly be constructed of several different materials.

Figure 2B:
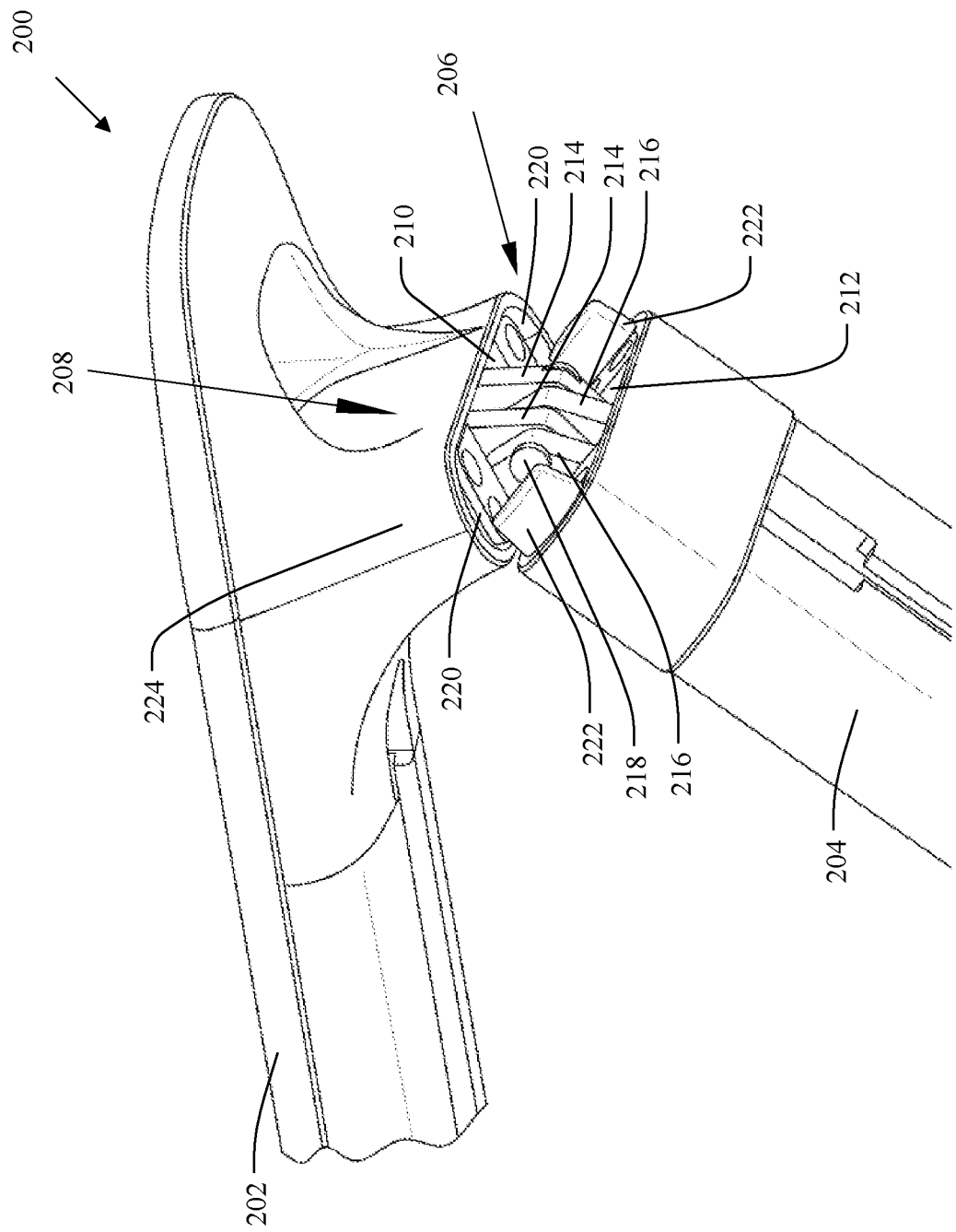
FIG. 2B illustrates a perspective view of the truck bed rack system of FIG. 2A in an intermediate state when rotating between the folded configuration and extended configuration.
Figure 2C:
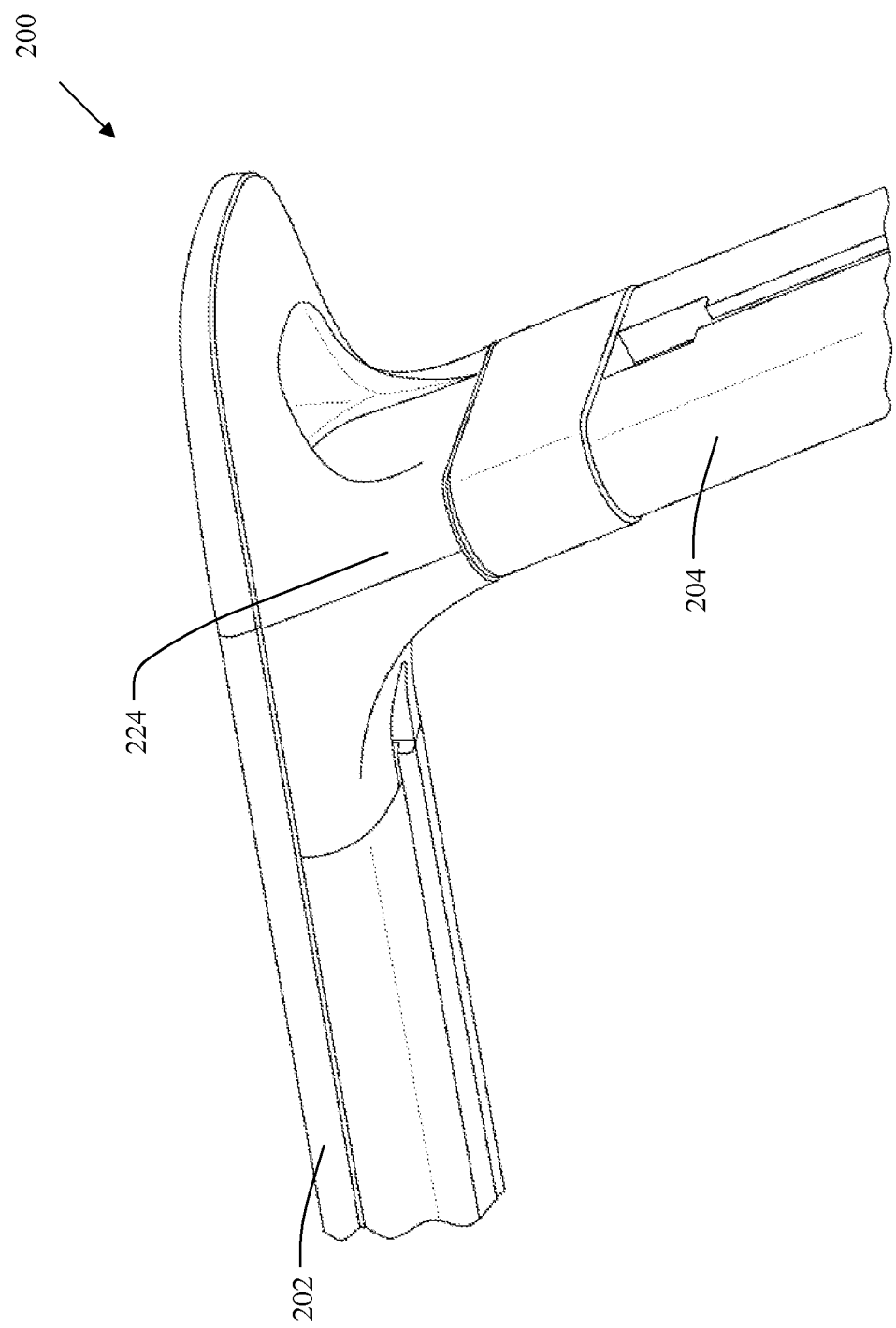
FIG. 2C illustrates a perspective view of the truck bed rack system of FIG. 2A in an extended configuration.

FIG. 2B illustrates a perspective view of the truck bed rack system 200 of FIG. 2A in an intermediate state when rotating between the folded configuration of FIG. 2A and the extended configuration of FIG. 2C. In the intermediate state, the first plurality of members 214 may be pivoting about the pin positioned inside of the recessed section 212 of the second bar 204, while the second plurality of members 216 may be pivoting about a separate pin positioned inside of the recessed section 210 of the first bar 202. Accordingly, the pin positioned inside the recessed section 212 may be considered the pivot point for the first plurality of members 214, while the pin positioned inside the recessed section 210 may be considered the pivot point for the second plurality of members 216. The first bar 202 and second bar 204 being coupled to the first plurality of members 214 and second plurality of members 216 may allow the pivoting motion to extend from the two sets of members 214 and 216 to the first and second bars such that the bars are able to rotate and thus reconfigure the rack system 200 between the folded and extended configurations. That is, as the first plurality of members 214 pivots about the pin positioned in the recessed section 212, the first bar 202 being coupled to the first plurality of members 214 via the recessed section 210 may allow the pivoting motion of the first plurality of members 214 to extend to the first bar 202. Similarly, as the second plurality of members 216 pivots about the pin positioned in the recessed section 210, the second bar 204 being coupled to the second plurality of members 216 via the recessed section 212 may allow the pivoting motion of the second plurality of members 216 to extend to the second bar 204. As a result, the hinge 206 may rotate the first bar 202 and second bar 204 to reconfigure the rack system 200 between the extended and folded configurations.

In addition to pivoting about the pins positioned in the recessed sections 210 and 212, the first bar 202 and second bar 204 may also slide along the first plurality of members 214 and second plurality of members 216, respectively, as the bars rotate to reconfigure the rack system between the folded and extended configurations. Specifically, the first bar 202 may slide along the first plurality of members 214 toward the pin 218, while the second bar 204 may slide along the second plurality of members 216 toward the pin 218. As a result, a greater portion of the first plurality of members 214 may become positioned inside of the recessed section 210 of the first bar 202, and similarly, a greater portion of the second plurality of members 216 may become positioned inside of the recessed section 212 of the second bar 204. This may in turn mean that a greater portion of the hinge 206 becomes positioned in the recessed sections 210 and 212 and thus a greater portion of the hinge 206 becomes enclosed by the first bar 202 and second bar 204. This may also allow the first bar 202 and second bar 204 to be brought together and come into contact with each other as the rack system 200 is reconfigured from the extended configuration to the folded configuration.

In the intermediate state, the protrusions 222 of the second bar 204 may also move toward and begin sliding into the recessed sections 220 of the first bar 202. Although FIG. 2B may illustrate the protrusions 222 as being outside of the recessed sections 220, the protrusions may also be positioned partially inside of the recessed sections in various other intermediate states. More generally, an intermediate state may refer to any arrangement of the first and second bars as they are rotating and reconfiguring the rack system between the folded and extended configurations. Thus, although a particular intermediate state may be shown in FIG. 2B, any state of the rack system as it rotates between the folded and extended configurations may be an intermediate state.

FIG. 2C illustrates a perspective view of the truck bed rack system 200 of FIG. 2A in an extended configuration. From the intermediate state of FIG. 2B, the first bar 202 and second bar 204 may continue to pivot about the pins positioned in the recessed sections 210 and 212 of the first bar 202 and second bar 204, as well as slide along the first plurality of members 214 and the second plurality of members 216 until the first and second bars make contact in the extended configuration. As shown in FIG. 2C, as well as FIG. 1A, the hinge 206 may be completely positioned inside of the recessed sections 210 and 212 when the rack system is in the extended configuration. Part of the hinge 206 may be positioned in the recessed section 210 of the first bar 202, while the remainder of the hinge 206 may be positioned in the recessed section 212 of the second bar 204. With the hinge 206 positioned inside of the recessed sections 210 and 212, the first bar 202 and second bar 204 may completely enclose the hinge 206 from the external environment, thereby protecting the hinge from the external environment. By extension, the hinge 206 may also become hidden from the perspective of the external environment.

When the rack system is rotated into the extended configuration, the protrusions 222 on the second bar 204 may be completely positioned inside the recessed sections 220 of the first bar 202. As a result, the pad that may be positioned at location 224 of the first bar 202 may be compressed by the protrusions 222. The pad may subsequently decompress when the hinge 206 rotates the first bar 202 and second bar 204 away from one another when reconfiguring the rack system from the extended configuration of FIG. 2C back to the folded configuration of FIG. 2A. When the pad decompresses, it may provide a restorative force to the second bar 204 to aid the hinge 206 in rotating the first and second bars when reconfiguring the rack system into the folded configuration. The pad's position at location 224 may also be at the end of or just before the end of the recessed sections 220 such that the protrusions 222 come into contact with the pad when the protrusions 222 are fully positioned in the recessed sections 220. However, the specific depth at which to position the pad may be different in various embodiments, and may be dependent on the size or structure of the recessed section 220 and the protrusions 222. Additionally, the pad positioned at location 224 may be constructed from various materials, such as rubber or plastic, but various other elastic materials may also be appropriate. As used herein, a pad may be understood to include any appropriate structure (such as springs) that may provide a restorative force to the second bar 204 when the first bar 202 and second bar 204 are rotated to reconfigure the rack system from the extended configuration to the folded configuration. Additionally, various embodiments may also include more than one specific component to provide the restorative force of the pad, such as including both a rubber component as well as a spring.

In various embodiments where the hinge 206 may include locking features, the locking features may also engage when the rack system is in the extended configuration to secure the rack system and prevent the rack system from unintentionally swinging closed from the extended configuration due to the weight of the bars or any accessory connected to the bars. Similar to how the locking features may operate when the rack system rotates into the folded configuration, the locking features may engage automatically when the rack system completely rotates into the extended configuration or be manually engaged by a user. Additionally, the locking features may engage differently between the configurations, where the locking features may engage automatically when the rack system rotates into the extended configuration but are manually engaged when the rack system rotates into the folded configuration. Additionally, in various embodiments where the hinge 206 may include damping features, the damping features may also help ease the rotation of the first bar 202 and second bar 204 into the extended configuration by slowing the rotation as the first and second bars approach the extended configuration. And in various embodiments where the hinge 206 may include tactile feedback mechanisms, the feedback mechanisms may help inform a user when the rack system has completely rotated into the extended configuration and is ready to be deployed onto a truck bed.

Figure 2D:
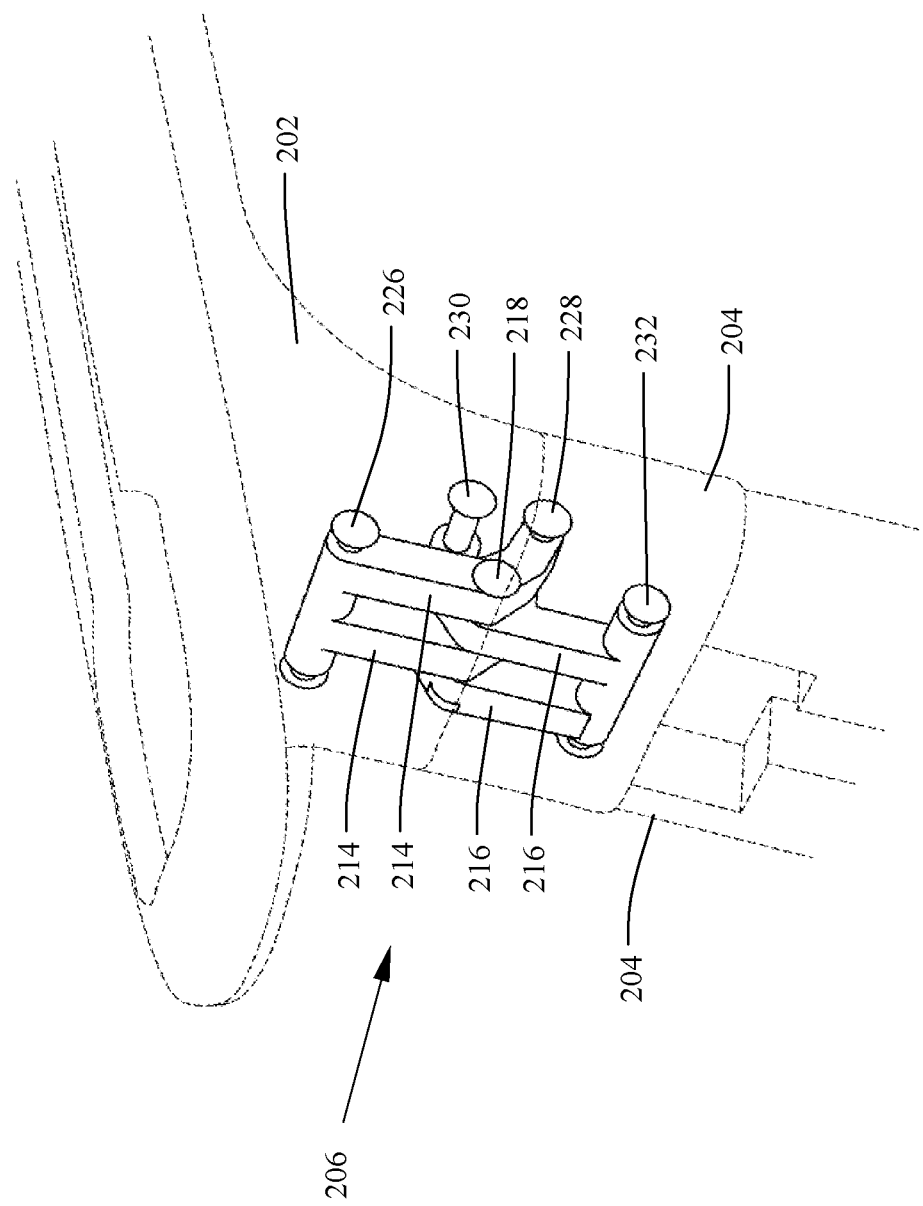
FIG. 2D illustrates a transparent perspective view of the truck bed rack system of FIG. 2A in the extended configuration along with additional details of the hinge.
Figure 2E:
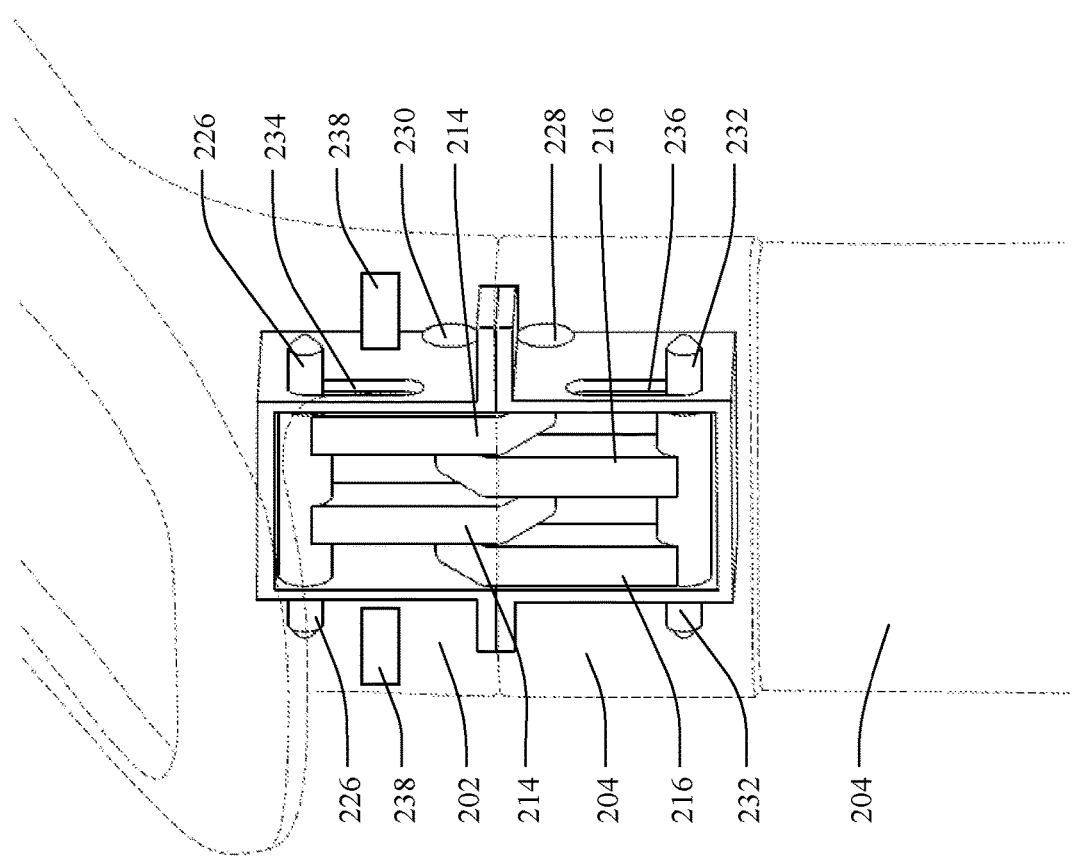
FIG. 2E illustrates a transparent side view of the truck bed rack system of FIG. 2A in the extended configuration with additional details.

FIG. 2D illustrates a transparent perspective view of the truck bed rack system 200 of FIG. 2A in the extended configuration along with additional details of the hinge 206. As mentioned above, the hinge 206 may include a first plurality of members 214 and a second plurality of members 216 coupled to the first bar 202 and the second bar 204, respectively, where the first and second plurality of members may be connected to each other by a pin 218 positioned through a tube structure formed when openings of the two sets of members are aligned. In the example of FIG. 2D, one end of the first plurality of members 214 may be coupled to the first bar 202 via a pin 226 positioned in and secured to the surfaces of the recessed section 210 of the first bar 202. The first plurality of members 214 may include a tube structure at the end coupled to the first bar 202, and the pin 226 may be positioned through that tube structure. Although the first plurality of members 214 may be securely coupled to the pin 226 in various embodiments, the first plurality of members 214 in various other embodiments may be more loosely coupled to the pin 226 such that the first plurality of members 214 remains able to pivot about the pin 226, where the pin 226 may be considered another pivot point for the first plurality of members in such cases. While one end of the first plurality of members 214 may be coupled to the first bar 202 via the pin 226, the other end of the first plurality of members may be coupled to the second bar 204 via a separate pin 228 positioned in and secured to the surfaces of the recessed section 212. The first plurality of members may include another tube structure at the end coupled to the second bar 204, and the pin 228 may be positioned through that tube structure. Similar to the pin 226, the first plurality of members 214 may also remain able to pivot about the pin 228, and thus the pin 228 may also be a pivot point for the first plurality of members 214. As the first plurality of members 214 pivots about the pin 228, the pivoting motion may extend to the first bar 202 as a result of the first bar 202 being coupled to the first plurality of members 214 via the pin 226. This may mean the hinge 206 and the first bar 202 pivot about the pivot point that is pin 228. This may allow the first bar 202 to rotate and thus allow the rack system to be reconfigured between the extended and folded configurations.

Similar to the first plurality of members 214, the second plurality of members 216 may also be coupled to both the first bar 202 and the second bar 204. Specifically, one end of the second plurality of members 216 may be coupled to the first bar 202 via a pin 230 positioned in and secured to the surfaces of the recessed section 210 of the first bar 202. The second plurality of members 216 may include a tube structure at the end coupled to the first bar 202, and the pin 230 may be positioned through that tube structure, with the second plurality of members 216 remaining able to pivot about the pin 230, and thus the pin 230 may also be a pivot point for the second plurality of members 216. It may be noted that one end of the pin 230 also extends a small length away from the second plurality of members 216 as shown in the figure. This may be because the first plurality of members 214 is positioned partially between the second plurality of members 216 and one surface of the recessed section 210 in the first bar 202, and thus securing the pin 230 to the surfaces of the recessed section 210 as mentioned above may include extending the pin 230 the additional length for the pin to be able to reach the surface. The pin 230 secured to the surfaces of the recessed section as a result of the additional length is also shown in FIG. 2E. The other end of the second plurality of members 216 may then be coupled to the second bar 204 via another pin 232 that is positioned in the recessed section 212 of the second bar 204. The second plurality of members 216 may similarly include a tube structure at the end coupled to the second bar 204 that the pin 232 may be positioned through. As with pin 230, the second plurality of members 216 may also remain able to pivot about the pin 232, where the pin 232 may be considered another pivot point for the second plurality of members in such cases. The second plurality of members 216 may pivot about the pin 230, and the pivoting motion may extend to the second bar 204 as a result of the second bar 204 being coupled to the second plurality of members via the pin 232. This may mean the hinge 206 and the second bar 204 pivots about the pivot point that is pin 230. This may allow the second bar 204 to rotate and thus allow the rack system to be reconfigured between the extended and folded configurations. In other words, the combination of the first plurality of members 214, the second plurality of members 216, and the pins 226, 228, 230, and 232 may allow the hinge 206 to be able to rotate the first bar 202 and second bar 204 to reconfigure the rack system 200 between the folded and extended configurations. Consequently, a first part of the hinge 206 may be attached to a first pivot point, i.e. the pin 226, in a first recessed section 210 of the first bar 202, while a second part of the hinge 206 may be attached to a second pivot point, i.e. the pin 232, in a second recessed section 212 of the second bar 204.

FIG. 2E illustrates a transparent side view of the truck bed rack system 200 of FIG. 2A in the extended configuration with additional details. As mentioned above, the rack system 200 may include pads 238 positioned at location 224 that may be compressed by the protrusions 222 when the rack system 200 reconfigures to the extended configuration. The hinge 206 may also include a pin 226 positioned inside of the recessed section 210 of the first bar 202 that couples the first plurality of members 214 to the first bar 202. The hinge 206 may also include a pin 228 positioned inside of the recessed section 212 of the second bar 204 that couples the first plurality of members 214 to the second bar 204. Additionally, the hinge 206 may also include a pin 230 positioned in the recessed section 210 of the first bar 202 to couple the second plurality of members 216 to the first bar 202, and a pin 232 positioned inside the recessed section 212 of the second bar 204 to couple the second plurality of members 216 to the second bar 204.

The rack system 200 as shown in FIG. 2E may also include an opening 234 on a side surface of the recessed section 210 of the first bar 202 and a similar opening 236 on a side surface of the recessed section 212 of the second bar 204. Although the openings 234 and 236 are only shown on one side surface of the recessed sections 210 and 212, respectively, various embodiments may also include mirrored openings on the opposite side surface of the recessed sections 210 and 212. The pin 226 may be positioned through the opening 234 such that the pin 226 is able to slide from one end of the opening 234 to the other end. As a result, the opening 234 may help provide the space for the first bar 202 to be able to slide along the first plurality of members 214 when the rack system rotates between the extended and folded configurations. Similarly, the pin 232 may be positioned through the opening 236 such that the pin 232 is able to slide from one end of the opening 236 to the other. As a result, the opening 236 may help provide the space for the second bar 204 to be able to slide along the second plurality of members 216 when the rack rotates between the extended and folded configurations.

Additionally, because the pins 226 and 232 may only slide through the space in the openings 234 and 236, the size of the openings 234 and 236 may also be adjusted in order to control the range of motion for the pins 226 and 232, respectively. Specifically, reducing the length of the openings 234 and 236 may reduce the distance the pins 226 and 232 may slide through and thus reduce the pins' range of motion, while increasing the length of the openings may increase the distance the pins may slide through and thus extend the pins' range of motion. By controlling the extent of the pins' possible movement in this way, the extent that the first bar 202 and second bar 204 are able to slide along the first plurality of members 214 and second plurality of members 216, respectively, may also be controlled.

Figure 3A:
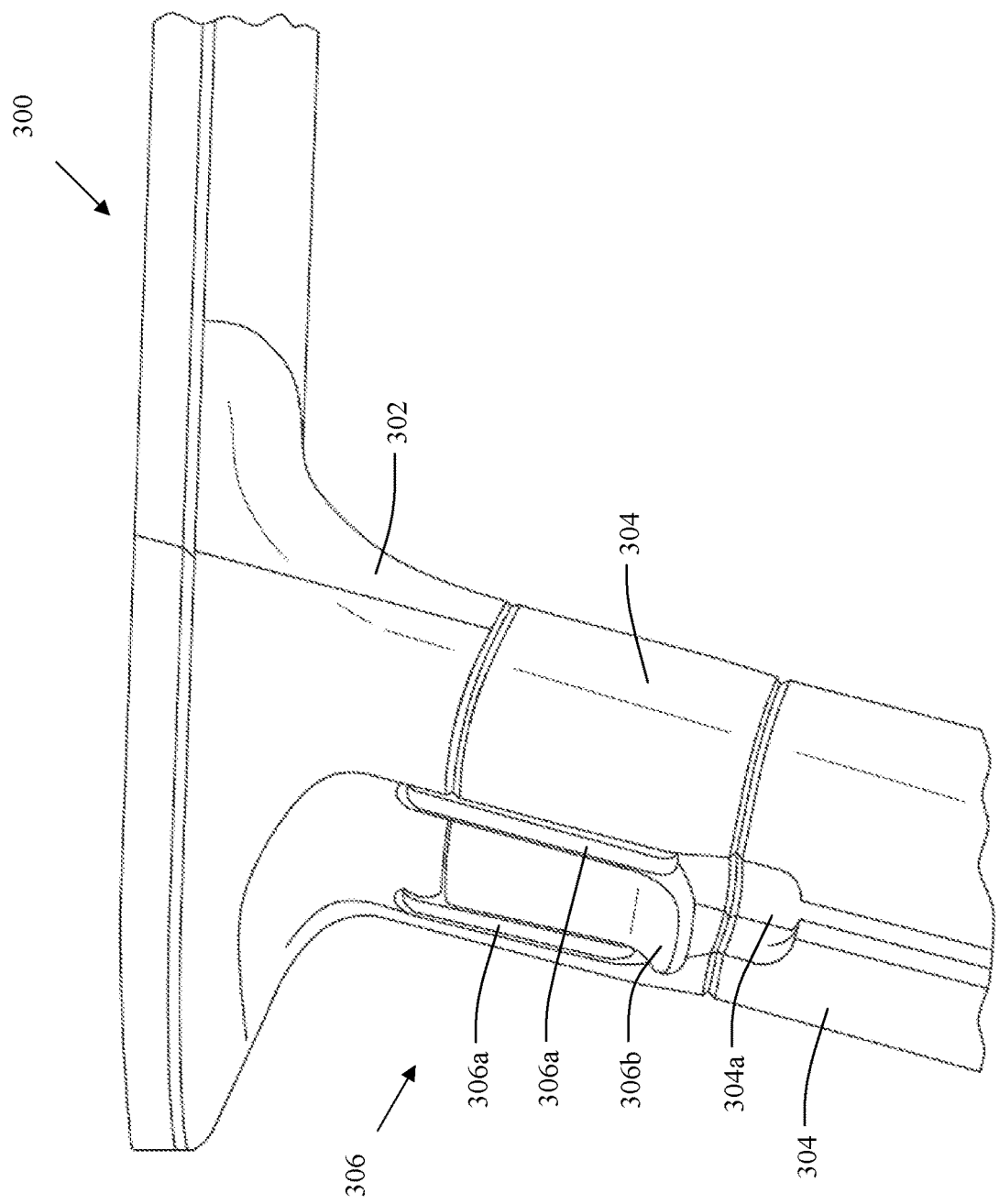
FIG. 3A illustrates a perspective view of a section on another embodiment of a truck bed rack system.

FIG. 3A illustrates a perspective view of a section on another embodiment of a truck bed rack system 300. The rack system 300 may include a first bar 302, a second bar 304, and a latch 306 configured to lock the first and second bars in place in the extended configuration as well as aid the rotation of the first and second bars between the extended and folded configurations. In various embodiments, the first bar 302 may be the first bar 202 of FIG. 2A and the second bar 304 may be the second bar 204 of FIG. 2A. The latch 306 may include a first plate 306a connected to the first bar 302 and a second plate 306b connected to the second bar 304. The first plate 306a may be secured to the second bar 304 by the second plate 306b when the rack system 300 is in the extended configuration, as described further herein. The second bar 304 may also include a small recessed section 304a positioned under the second plate 306b of the latch 306 in order to support easy access to the underside of the second plate 306b in order to lift the plate and release the latch 306. The rack system 300 may also include a hinge that is enclosed by the first 302 and second 304 bars of the rack system and not externally exposed in the extended configuration, where the hinge of the rack system 300 may be the hinge 206 of FIG. 2A.

Figure 3B:
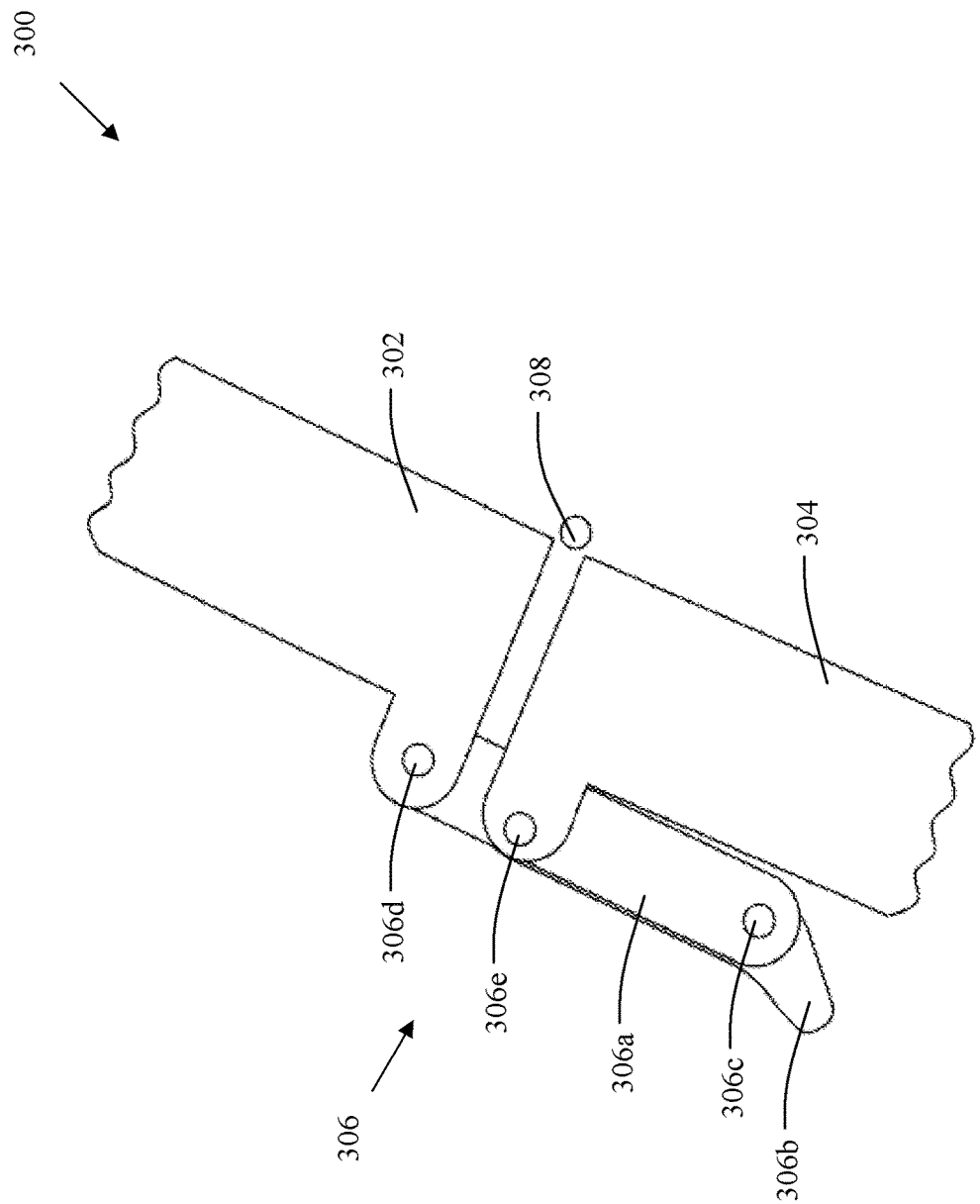
FIG. 3B illustrates a front view schematic of the truck bed rack system of FIG. 3A.

FIG. 3B illustrates a front view schematic of the truck bed rack system 300 of FIG. 3A. The first bar 302 and second bar 304 of the rack system 300 may be connected by the latch 306 as well as the hinge 308. The latch 306 may include a first plate 306a and a second plate 306b that are connected together by a pivot point 306c. This may allow the first plate 306a and second plate 306b to rotate relative to one another about the pivot point 306c when the rack system 300 rotates between the extended configuration and a folded configuration. The first plate 306a may also be connected to the first bar 302 at another pivot point 306d, while the second plate 306b may be connected to the second bar at a third pivot point 306e. As a result, the first plate 306a may be able to rotate relative to the first bar 302 by pivoting about the pivot point 306d, and similarly, the second plate 306b may be able to rotate relative to the second bar 304 by pivoting about the pivot point 306e. Additionally, in the extended configuration, the second plate 306b may clamp down on the first plate 306a such that both plates are secured to the surface of the second bar 304. The second plate 306b clamping down on the first plate 306a may create tension at the pivot points 306d and 306e that locks the first bar 302 and second bar 304 in place in the extended configuration. The pivot points 306c, 306d, and 306e may be any appropriate structure that would allow the two corresponding components connected to them to pivot. For example, the first plate 306a and the second plate 306b may each include openings that are aligned to form a hollow tube structure. The pivot point 306c may then include a pin, similar to the pin 218 of FIG. 2A, positioned through the openings of the two plates, where the plates may then pivot about that pin to rotate relative to one another. The hinge 308 may also be any appropriate structure that would allow the first 302 and second 304 bars to rotate relative to one another, which may include a pin that is enclosed by the first 302 and second 304 bars. However, in various embodiments, the hinge 308 may include some or all the components of the hinge 206 of FIG. 2A as described above. In embodiments where the hinge 308 may include components of the hinge 206, the specific position of the hinge 308 may be positioned closer to the latch 306 than as shown in the figure as well as at least partially inside of the first 302 and second 304 bars as shown and described above with respect to FIGS. 2A-2E.

Figure 3C:
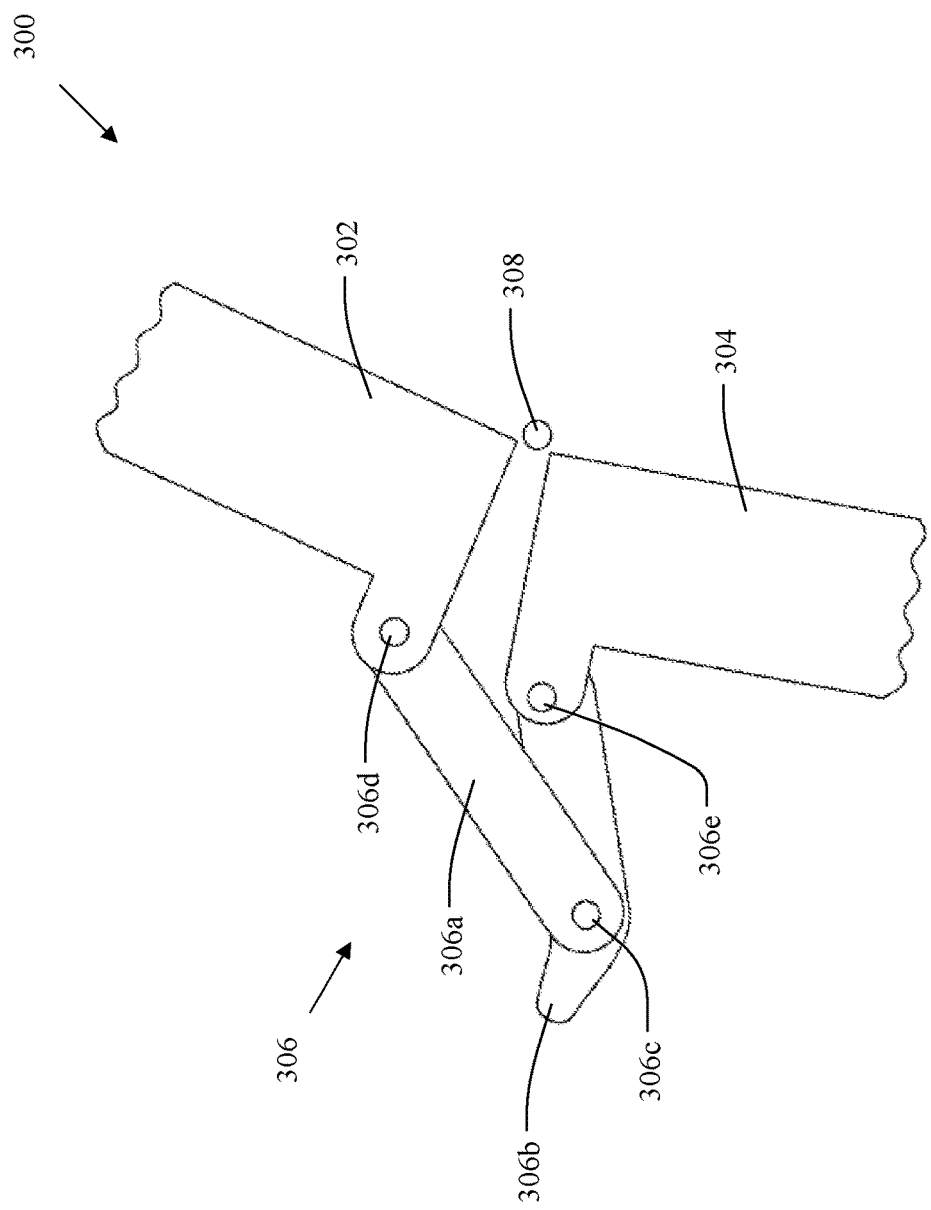
FIG. 3C illustrates a front view schematic of the truck bed rack system of FIG. 3B after the latch has been released.

FIG. 3C illustrates a front view schematic of the truck bed rack system 300 of FIG. 3B after the latch 306 has been released. The latch 306 may be released by lifting the second plate 306b away from the surface of the second bar 304, which may in turn release the first bar 302 and second bar 304 from being secured to the surface of the second bar 304. Specifically, the hooked end of the second plate 306b may be pulled away from the second bar 304. By lifting the second plate 306b, the tension in the pivot points 306d and 306e may be released. Without the tension to lock the first 302 and second 304 bars in place, rotational freedom may be returned to the first bar 302 and second bar 304. The second bar 304 in particular may then begin to rotate in a counterclockwise direction under its own weight.

Releasing the second plate 306b may include swinging the second plate outward away from the second bar 304 by pivoting about the pivot point 306e. As the second plate 306b swings away from the second bar 304, the first plate 306a may also swing outward with the second plate by pivoting about pivot point 306d, as a result of the two plates being connected by pivot point 306c. The first plate 306a and second plate 306b may also rotate relative to one another while swinging away from the second bar 304 by pivoting about the pivot point 306c. As the second plate 306b continues to swing in an upward direction, its connection to the first plate 306a may limit the extent that the second plate 306b is able to swing in that direction. Consequently, the normal force that the first plate 306a may exert on the second plate 306b as the latter continues swinging upward may be transferred back to the second plate 306b, and may in turn result in the second plate 306b exerting a force that pushes against the second bar 304. The pushing force exerted on the second bar 304 may further result in the second bar 304 rotating in a counterclockwise direction and thus guide the rotation of the second bar 304 as the rack system is reconfigured to the folded configuration.

Figure 3D:
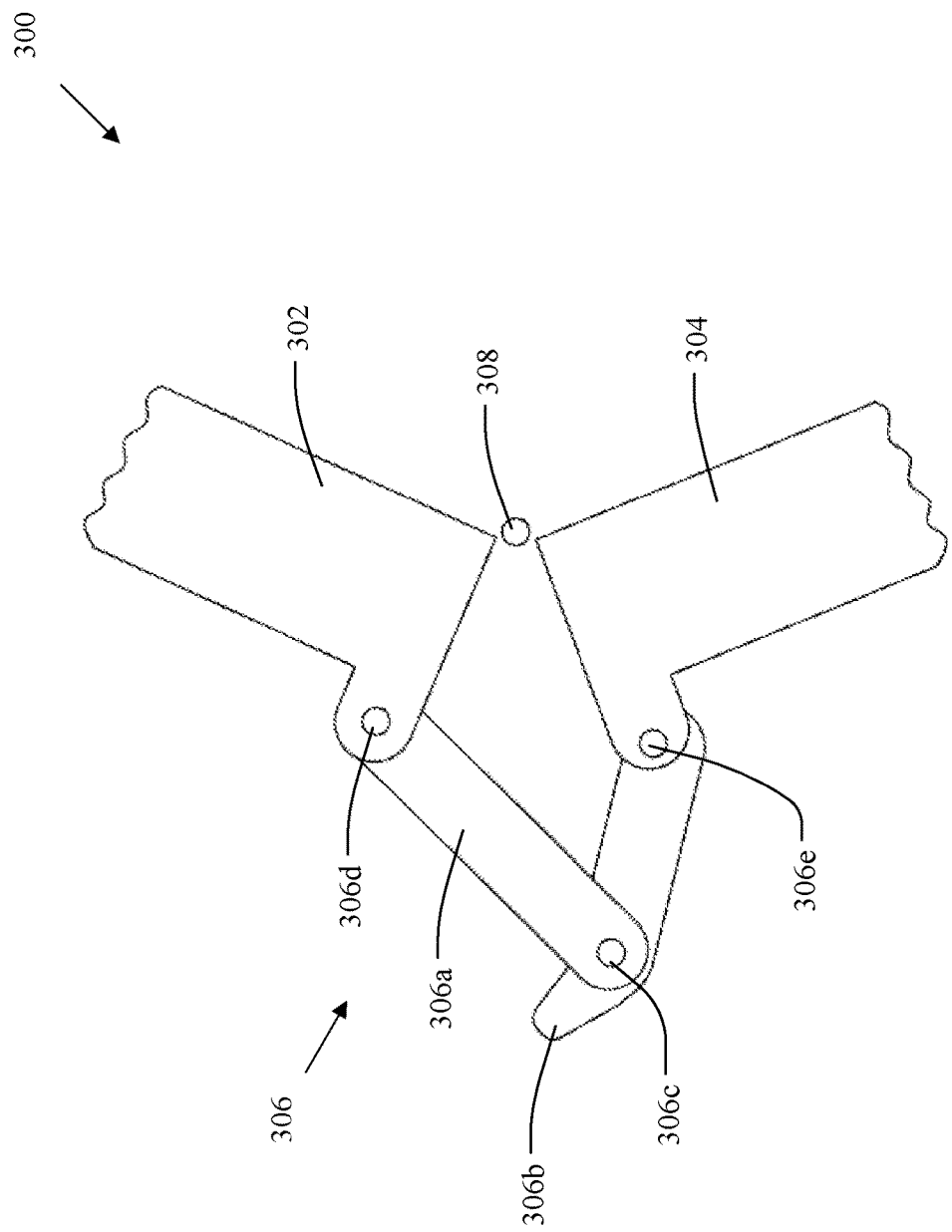
FIG. 3D illustrates a front view schematic of the truck bed rack system of FIG. 3C in an intermediate state as it rotates further towards a folded configuration.

FIG. 3D illustrates a front view schematic of the truck bed rack system 300 of FIG. 3C in an intermediate state as it rotates further towards a folded configuration. In the intermediate state, the second bar 304 may have rotated further in the counterclockwise direction along the hinge 308, compared to the state in FIG. 3C. The second bar's rotation along the hinge 308 may not be limited by its connection to the second plate 306b as the second bar 304 may also be able to rotate relative to the second plate 306b due to the pivot point 306e. The second plate 306b may also begin swinging in a downward direction after its initial upward travel as a result of the second bar 304 rotating further in the counterclockwise direction. In the process, the first plate 306a may also begin swinging in a downward direction by pivoting about the pivot point 306d, as a result of being connected to the second plate 306b at pivot point 306c. The first plate 306a and second plate 306b may also rotate relative to each other while both swinging downward by pivoting about the pivot point 306c. The first and second plates may rotate relative to each other due to their travel paths being different, which may be a result of the plates having different lengths as well as being connected to different bars of the rack system 300.

Figure 3E:
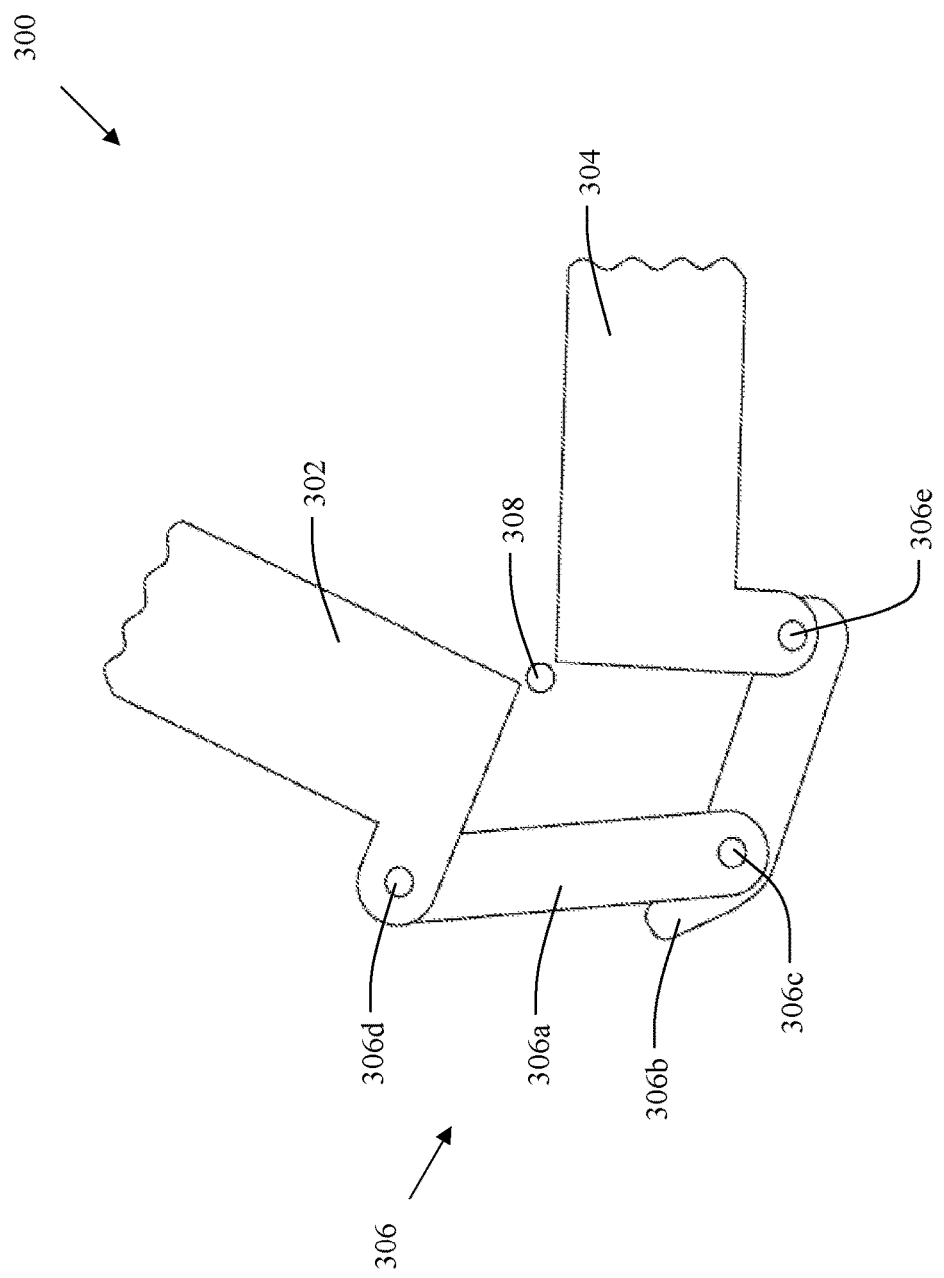
FIG. 3E illustrates a front view schematic of the truck bed rack system of FIG. 3D after it rotates into a folded configuration.

FIG. 3E illustrates a front view schematic of the truck bed rack system 300 of FIG. 3D after it rotates into a folded configuration. To rotate the rack system into the folded configuration, the second bar 304 may have rotated even further in the counterclockwise direction compared to the state in FIG. 3D. The second plate 306b may have also traveled further to the right as a result of being connected to the second bar 304, and the first plate 306a may have also rotated further in the counterclockwise direction as a result of being connected to the first plate 306a. As mentioned above with respect to FIG. 3D, the first plate 306a and second plate 306b may have continued to rotate relative to each other as the rack system 300 rotated into the folded configuration due to their travel paths being different. Since the latch 306 itself may not be able to lock the first 302 and second 304 bars in place in the folded configuration, the rack system 300 may also include locking features that engage when in the folded configuration to prevent the first and second bars from unintentionally swinging open from the folded configuration. It may also be noted that while the description of FIGS. 3A-3E herein are made with respect to a particular embodiment of the latch 306, various other latch embodiments may also be appropriate to help lock the first 302 and second 304 bars in place when the rack system is in the extended configuration as well as aid the rotation of the first and second bars as the rack system rotates between the extended and folded configurations.

Figure 4A:
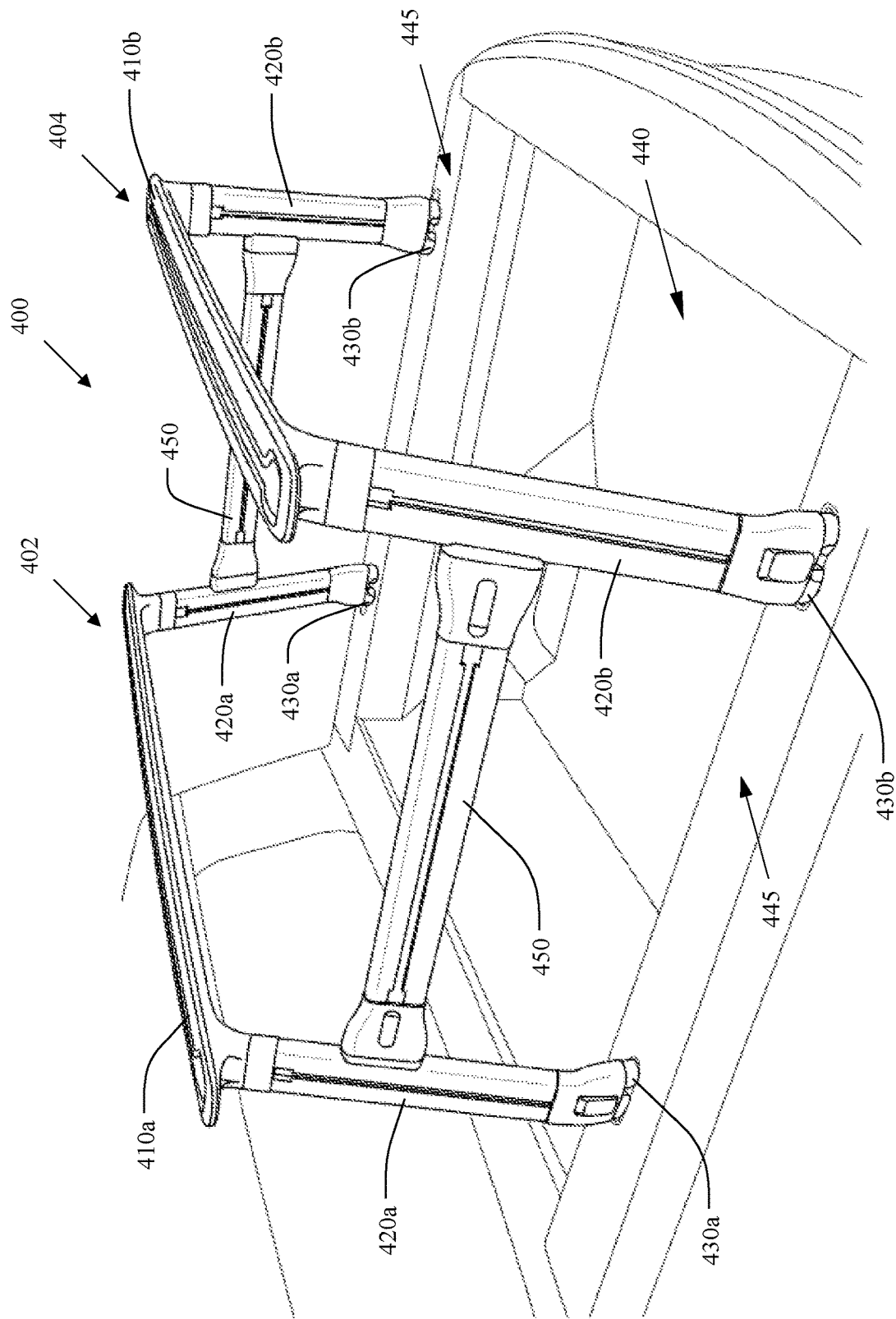
FIG. 4A illustrates an example application of truck bed rack systems in the extended configuration.

FIG. 4A illustrates an example application 400 of truck bed rack systems in the extended configuration. The example application 400 may include a first truck bed rack system 402 installed near one end of the truck bed 440 and a second truck bed rack system 404 installed near the other end of the truck bed 440. The first rack system 402 may include a first top bar 410a and first side bars 420a connected to the first top bar 410a, while the second rack system 404 may include a second top bar 410b and second side bars 420b connected to the second top bar 410b. The first top bar 410a and second top bar 410b may each be the first bar 110 of the rack system 100 of FIGS. 1A-1B or the first bar 202 of FIGS. 2A-2E. Similarly, the first side bars 420a and second side bars 420b may each be the second bar 120 of the rack system 100 of FIGS. 1A-1B or the second bar 204 of FIGS. 2A-2E. The first rack system 402 may be deployed onto the truck bed 440 by securely attaching the first side bars 420a to the truck bed side walls 445, such as through attachment points 430a at the bottom of the first side bars 420a. Similarly, the second rack system 404 may be deployed onto the truck bed 440 by securely attaching the second side bars 420b to the truck bed side walls 445, such as through attachment points 430b at the bottom of the second side bars 420b. The attachment points 430 may each be the attachment point 130 of FIGS. 1A-1B.

The example application 400 may also include cross braces 450 installed between the first rack system 402 and the second rack system 404. One end of the cross braces 450 may securely attach to the first side bars 420a of the first rack system 402, while a second end of the cross braces 450 may securely attach to the second side bars 420b of the second rack system 404. In various embodiments, the cross braces 450 may be installed to provide additional support to the first and second rack systems such that the rack systems may allow heavier objects to be attached to them. The cross braces 450 may also support the first rack system 402 and second rack system 404 by limiting the lateral movement of the rack systems, thereby reducing the likelihood of damage to the rack system's components. Although cross braces are discussed with respect to the example application 400, various other bars and objects may also be appropriate to install to provide support to the first and second rack systems. Additionally, the application 400 may include a first rack system 402 and a second rack system 404, but the cross braces 450 may also be installed in applications with only one rack system, such as the first rack system 402. In such embodiments, one end of the cross braces 450 may be securely attached to the first side bars 420a, while the second end of the cross braces 450 may be securely attached to the vehicle, such as to the truck bed side walls 445 or to the roof of the vehicle.

Figure 4B:
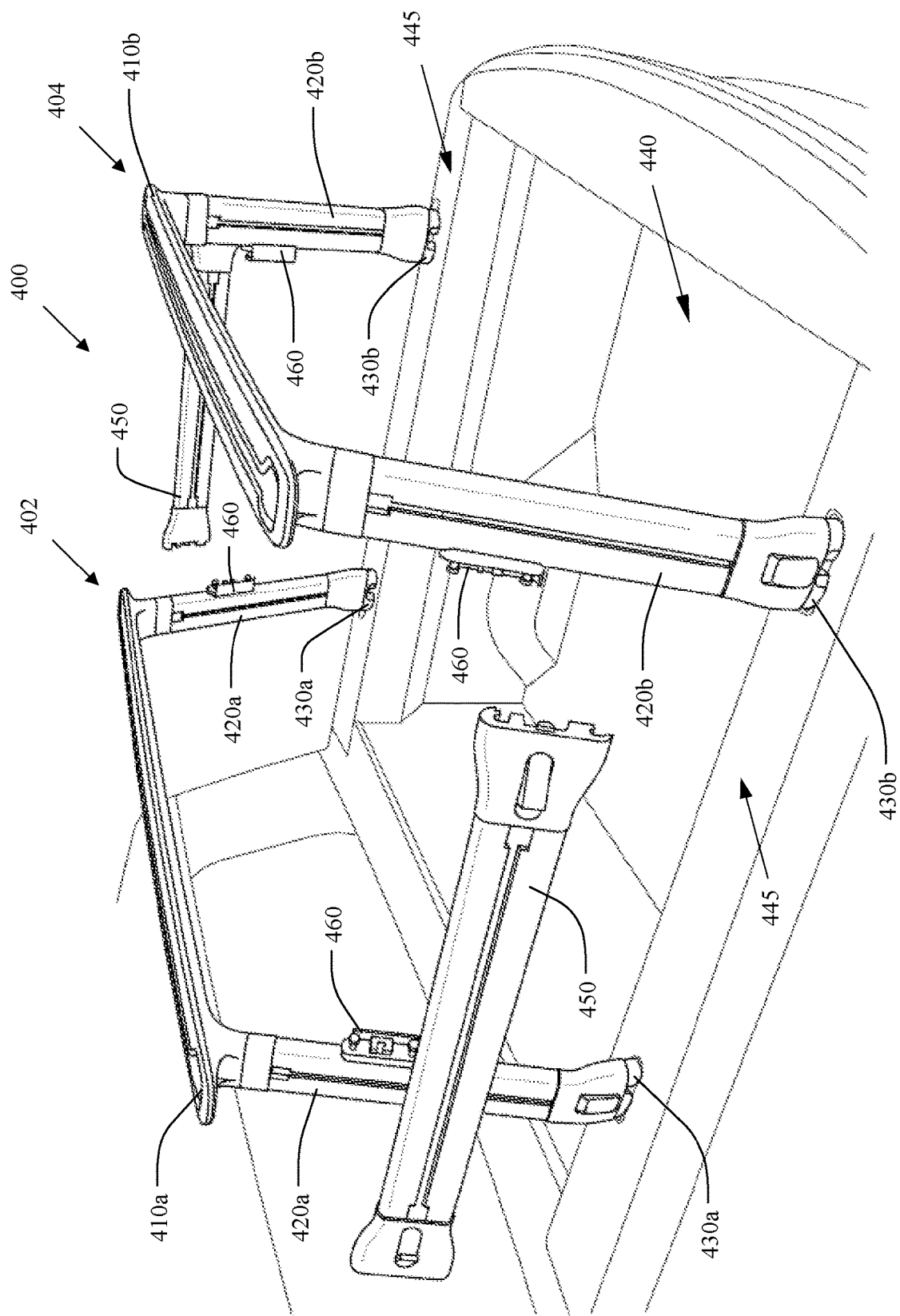
FIG. 4B illustrates the example application of truck bed rack systems where the cross braces have been disconnected from the rack systems.

FIG. 4B illustrates the example application 400 of truck bed rack systems where the cross braces 450 have been disconnected from the first rack system 402 and second rack system 404. The ends of the cross braces 450 may be structured to couple with attachment points 460 on the first side bars 420a of the first rack system 402 and the second side bars 420b of the second rack system 404. Additionally, the ends of the cross braces 450 and attachment points 460 may be structured such that the cross braces 450 and attachment points 460 may easily connect to one another and also easily disconnect from one another. For example, the attachment points 460 may include fasteners such as bolts that the ends of the cross braces 450 engage with when the cross braces 450 and attachment points 460 connect to one another. The ends of the cross braces 450 may then disengage from the fasteners when the cross braces 450 and attachment points 460 disconnect from one another.

Figure 5:
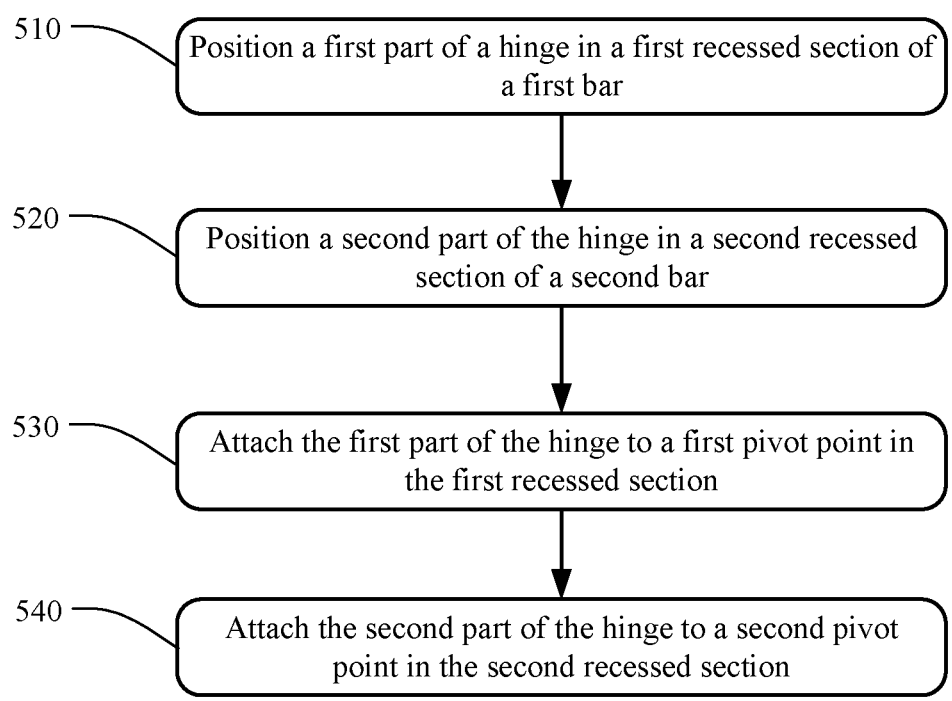
FIG. 5 illustrates a method for assembling a truck bed rack system.

FIG. 5 illustrates a method 500 for assembling a truck bed rack system. As described above with respect to FIG. 2A, the truck bed rack system may include a first bar and a second bar connected by a hinge that rotates the first and second bars to reconfigure the rack system between an extended configuration and a folded configuration, where the hinge may include a first plurality of members and a second plurality of members. The first bar may be the first bar 202 of FIG. 2A, the second bar may be the second bar 204 of FIG. 2A, the hinge may be the hinge 206 of FIG. 2A, the first plurality of members may be the first plurality of members 214 of FIG. 2A, and the second plurality of members may be the second plurality of members 216 of FIG. 2A. The method 500 may begin at step 510 by positioning a first part of the hinge in a first recessed section of the first bar. The first part of the hinge may include any section of the hinge that is positioned into the first recessed section. The first recessed section of the first bar may be located at the end of a section that extends away from another generally elongate section of the first bar, such as section 208 of FIG. 2A. The first recessed section may be the recessed section 210 of FIG. 2A. In various embodiments, the first part of the hinge may include a part of the hinge less than the entirety of the hinge, but the first part of the hinge in other embodiments may include the entirety of the hinge. The latter embodiments may mean the entire hinge is positioned in the first recessed section.

At step 520, a second part of the hinge may be positioned in a second recessed section of the second bar. The second part of the hinge positioned in the second recessed section may be any section of the hinge that was not positioned in the first recessed section. The second part may include a section of the hinge that is of varying lengths which depend on the length of the first part. The second recessed section may be located at an end of the second bar, or like the first recessed section, at the end of a section that extends away from another generally elongate section of the second bar. The second recessed section may be the recessed section 212 of FIG. 2A. In embodiments where the first part includes the entirety of the hinge, there may not be a second part of the hinge to position in the second recessed section, in which case method 500 may skip step 520 and proceed from step 510 directly to step 530.

Because the hinge may include a first and second plurality of members, positioning the hinge in the first and second recessed sections may mean positioning the first and second plurality of members in the first and second recessed sections. The first part of the hinge positioned in the first recessed section may thus include some section of the first and second plurality of members. The first plurality of members may be positioned farther into the first recessed section. That is, the end of the first plurality of members positioned in the first recessed section may be positioned closer toward the inner end of the first recessed section than the opening end. The inner end may be the end of the first recessed section farthest into the first recessed section while the opening end may be the end opposite the inner end that leads out of the first recessed section. On the other hand, the second plurality of members may be positioned closer towards the opening end of the first recessed section than the inner end. The positioning of the first and second plurality of members may correspond to FIG. 2D, where the section of the first plurality of members 214 positioned in the first bar 202 is positioned farther into the first bar than the section of the second plurality of members 216 positioned in the first bar 202.

Similarly, positioning the second part of the hinge in the second recessed section of the second bar may mean positioning any section of the first and second plurality of members not in the first recessed section in the second recessed section. In this case, the end of the first plurality of members positioned in the second recessed section may be positioned closer toward the opening end of the second recessed section than the inner end. On the other hand, the second plurality of members may be positioned closer toward the inner end of the second recessed section than the opening end. This positioning of the first and second plurality of members may also correspond to FIG. 2D, where the section of the second plurality of members 216 positioned in the second bar 204 is positioned farther into the second bar 204 than the first plurality of members 214.

After the hinge has been positioned in the first and second recessed sections, method 500 may proceed to step 530 to attach the first part of the hinge positioned in the first recessed section to a first pivot point in the first recessed section. The end of the hinge's second plurality of members positioned in the first recessed section may include a tube structure or a series of openings where a pin, or similar component such as a rod or shaft, may be positioned through. The pin may then be secured to the side surfaces of the first recessed section, such as by welding to the side surfaces. The second plurality of members may remain able to pivot about the pin in order to rotate the second bar and reconfigure the rack system between the extended and folded configurations. The second plurality of members may also be attached to the second bar through the second recessed section, as described below, and thus pivoting the second plurality of members may result in the second bar pivoting or rotating as well. This pin may correspond to pin 230 of FIG. 2D. The second plurality of members pivoting about the pin may allow the hinge to reconfigure the rack system, and thus the pin may be the first pivot point in the first recessed section that the first part of the hinge positioned in the first recessed section is attached to.

In a similar way, the end of the hinge's first plurality of members positioned in the first recessed section may also include a tube structure or a series of openings where a second pin, or a similar component such as a rod or shaft, may be positioned through. The second pin may then also be secured to the side surfaces of the first recessed section, such as by welding to the side surfaces. The first plurality of members may be securely coupled to the second pin such that the first plurality of members does not retain rotational freedom, but the first plurality of members may also be more loosely coupled to the second pin such that the first plurality of members remains able to pivot about the second pin. In the latter case, the second pin may thus also be a pivot point for the first plurality of members and a second pivot point in the first recessed section. This second pin may correspond to pin 226 of FIG. 2D.

Method 500 may then proceed to step 540 to attach the second part of the hinge positioned in the second recessed section to a second pivot point in the second recessed section. The end of the hinge's first plurality of members positioned in the second recessed section may also include a tube structure or a series of openings where a pin, or similar component such as a rod or shaft, may be positioned through. The pin may be secured to the side surfaces of the second recessed section, such as by welding to the side surfaces. The first plurality of members may remain able to pivot about this pin order to rotate the first bar and reconfigure the rack system between the extended and folded configurations. Since the first plurality of members may also be attached to the first recessed section of the first bar, as described above, pivoting the first plurality of members may also result in the first bar pivoting or rotating as well. This pin may correspond to pin 228 of FIG. 2D. The first plurality of members pivoting about the pin may allow the hinge to reconfigure the rack system, and thus the pin may be the second pivot point in the second recessed section that the second part of the hinge positioned in the second recessed section is attached to.

The end of the hinge's second plurality of members positioned in the second recessed section may also include a tube structure or a series of openings where a second pin, or similar component such as a rod or shaft, may be positioned through. The second pin may also be secured to the side surfaces of the second recessed section, such as by welding to the side surfaces. The second plurality of members may be securely coupled to the second pin such that the second plurality of members does not retain rotational freedom, but the second plurality of members may also be more loosely coupled to the second pin such that the second plurality of members remains able to pivot about the second pin. In the latter case, the second pin may thus also be a pivot point for the second plurality of members and a second pivot point in the second recessed section. This second pin may correspond to pin 232 of FIG. 2D. As described above, the first part of the hinge in some embodiments may include the entirety of the hinge, and thus there may not be a second part of the hinge. In such embodiments, method 500 may also skip step 540 as there may not be a second part of the hinge to attach to the second pivot point.

The first plurality of members pivoting the first bar and the second plurality of members pivoting the second bar may allow the hinge to rotate the first and second bars when reconfiguring the rack system between the extended and folded configurations. It may also be advantageous to hold the first and second plurality of members together to prevent them from becoming loose during operation. As described earlier, each of the members in the first and second plurality of members may include an opening along their lengths. After the first and second plurality of members have been attached to the first and second recessed sections, the openings of all the constituent members in the first and second plurality of members may be aligned to form a tube structure. Another pin may then be positioned into the tube structure and thus through all of the constituent members of the first and second plurality of members to connect them together. This pin may then be secured, using an appropriate method such as a retaining ring or cotter pin, without attaching to the sides of the first and second recessed sections or the first and second bars as the pin may not make contact with them so that the first and second bars may be rotated to reconfigure the rack system. This pin may correspond to the pin 218 of FIG. 2D.

Figure 6:
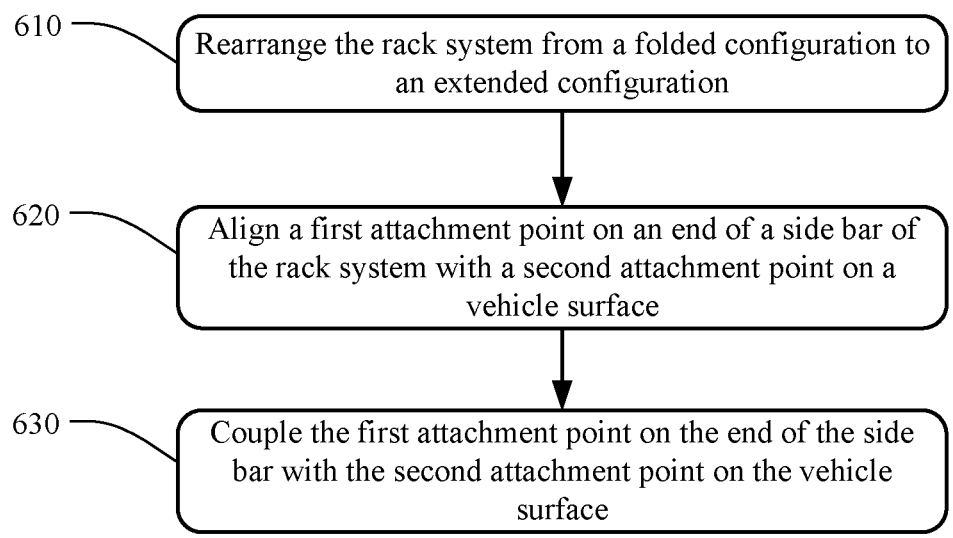
FIG. 6 illustrates a method for installing a truck bed rack system onto a vehicle, such as onto the truck bed of the vehicle.

FIG. 6 illustrates a method 600 for installing a truck bed rack system onto a vehicle, such as onto the truck bed of the vehicle. As mentioned above with respect to FIG. 1A, the rack system may be reconfigured between an extended configuration and a folded configuration, where the rack system in the extended configuration may be deployed onto the truck bed of a vehicle and the rack system in the folded configuration may reduce the storage space requirement when stowed. Thus, to install the rack system onto a vehicle, method 600 may begin at step 610 to rearrange the rack system from a folded configuration to an extended configuration. This may include rotating or reconfiguring the rack system from the folded configuration, which may be used to store the rack system, to the extended configuration so the rack system may be ready to be deployed on to the vehicle.

Method 600 may then proceed to step 620 to align a first attachment point on an end of a side bar of the rack system with a second attachment point on a vehicle surface. The rack system may include a first bar and a second bar, where the first bar may be a top bar that extends transversely across the truck bed and supports other objects that are attached to the rack system, while the second bar may be a side bar that is attached to the truck bed and provides support to the top bar. Installing the rack system onto the vehicle may include attaching the side bar of the rack system to the truck bed or any other vehicle surface, which in turn may include coupling a first attachment point on the end of the side bar to a corresponding or second attachment point on the vehicle surface. The first and second attachment points may be aligned so that they may subsequently be coupled to secure the rack system to the vehicle surface. The first attachment point may correspond to the attachment point 130 of FIG. 1B, while the second attachment point may correspond to any one of the attachment points 180 of FIG. 1B. As described above, the first and second attachment points may be various structures where the second attachment point is configured to couple with the first attachment point. Coupling the first and second attachment points may physically secure the rack system to the vehicle surface.

Once the first and second attachment points have been aligned, method 600 may proceed to step 630 to couple the first attachment point on the end of the side bar with the second attachment point on the vehicle surface. As described above, this may physically secure the rack system to the vehicle surface, and thus allows the rack system to be installed onto the vehicle. Coupling the first and second attachment points may include various operations depending on the structure of the two attachment points. For example, the first and second attachment points may automatically couple with each other once the attachment points are brought together, such as when the side bar is positioned into place. Alternatively, a trigger on either the rack system or vehicle may be activated once the side bar has been positioned in place to cause the first and second attachment points to couple with one another.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. An apparatus, comprising:
   a first bar having a recessed section;
   a second bar elongated along a direction and comprising a protrusion extending in the direction; and
   a hinge connected to the first bar and the second bar, wherein the hinge reconfigures the first bar and the second bar between an extended configuration and a folded configuration and wherein:
      in the extended configuration, the protrusion is positioned in the recessed section and the hinge is enclosed by the first bar and the second bar such that the hinge is not externally exposed; and
      in the folded configuration, the protrusion is positioned out of the recessed section.

2. The apparatus of claim 1, wherein the hinge is further configured to rotate the second bar relative to the first bar when reconfiguring the apparatus between the extended configuration and the folded configuration.

3. The apparatus of claim 1, wherein the first bar comprises a top bar and the second bar comprises a side bar.

4. The apparatus of claim 1, wherein the hinge comprises a first plurality of members coupled to the first bar and a second plurality of members coupled to the second bar, wherein the first plurality of members and the second plurality of members are connected by a pin.

5. The apparatus of claim 1, wherein the first bar moves along a first plurality of members of the hinge and the second bar moves along a second plurality of members of the hinge when the hinge reconfigures the apparatus between the extended configuration and the folded configuration.

6. The apparatus of claim 1, wherein an angle between the first bar and the second bar when the apparatus is in the folded configuration is less than 90 degrees, and wherein the angle between the first bar and the second bar when the apparatus is in the extended configuration is at least 90 degrees.

7. The apparatus of claim 1, wherein the first bar comprises a pad that is compressed when the apparatus is in the extended configuration, wherein the pad decompresses to provide a force to the second bar when the apparatus is reconfigured from the extended configuration to the folded configuration.

8. The apparatus of claim 1, wherein the hinge is exposed when the apparatus is in the folded configuration.

9. The apparatus of claim 1, wherein the first bar comprises an additional recessed section, wherein the hinge is positioned in the additional recessed section.

10. The apparatus of claim 9, wherein the hinge pivots about a pivot point in the recessed section when the apparatus is reconfigured between the extended configuration and the folded configuration.

11. The apparatus of claim 1, further comprising a latch connected to the first bar, wherein the latch locks the first bar in place when the apparatus is reconfigured in the extended configuration.

12. The apparatus of claim 1, wherein the first bar comprises an attachment point for attaching the second bar.

13. The apparatus of claim 1, further comprising a lock to secure the first bar in place when the apparatus is in the extended configuration and when the apparatus is in the folded configuration.

14. An apparatus, comprising:
a first rack;
a second rack; and
a cross brace; wherein:
the first rack comprises a first top bar and a first side bar connected to the first top bar, and wherein the second rack comprises a second top bar and a second side bar connected to the second top bar;
the first top bar and the second top bar each have a respective recessed section, the first side bar and the second side bar each are respectively elongated along a direction and comprise a protrusion extending in the direction;
in an extended configuration, the respective protrusions are positioned in the respective recessed sections of the first and second top bars;
in a folded configuration, the respective protrusions are positioned out of the respective recessed sections of the first and second top bars; and
the cross brace is connected to the first side bar of the first rack and the second side bar of the second rack.

15. The apparatus of claim 14, wherein the cross brace is configured to connect to and disconnect from the first side bar of the first rack via an attachment point on the first side bar of the first rack.

16. The apparatus of claim 14, wherein the first rack comprises a hinge connected to the first top bar and the first side bar, and wherein the hinge reconfigures the first rack between the extended configuration and the folded configuration.

17. An apparatus, comprising:
a first bar having a recessed section; and
a hinge connected to the first bar and configured to connect with a second bar elongated along a direction and comprising a protrusion extending in the direction, wherein the hinge reconfigures the first bar and the second bar between an extended configuration and a folded configuration, and wherein:
in the extended configuration, the protrusion is positioned in the recessed section and the hinge is enclosed by the first bar and the second bar such that the hinge is not externally exposed; and
in the folded configuration, the protrusion is positioned out of the recessed section.

* * * * *